(12) United States Patent
Gossett et al.

(10) Patent No.: US 8,396,086 B1
(45) Date of Patent: Mar. 12, 2013

(54) SCALABLE ASSOCIATION SCHEME FOR TV WHITE-SPACE MIMO WIRELESS SYSTEM

(75) Inventors: Carroll Philip Gossett, Mountain View, CA (US); Yuan Yuan, Sunnyvale, CA (US); Kevin C. Yu, Palo Alto, CA (US); Xiaofang Jiang, Mntgomery, AL (US); Michial Allen Gunter, Oakland, CA (US); Emmanouil Koukoumidis, Athens (GR)

(73) Assignee: Google Inc., Mountain View, CA (US)

( * ) Notice: Subject to any disclaimer, the term of this patent is extended or adjusted under 35 U.S.C. 154(b) by 648 days.

(21) Appl. No.: 12/570,866

(22) Filed: Sep. 30, 2009

(51) Int. Cl.
*H04J 3/06* (2006.01)

(52) U.S. Cl. ........ 370/508; 370/236; 370/280; 370/314; 370/328; 370/334; 370/342; 370/376; 370/458; 370/461

(58) Field of Classification Search .................. 370/342, 370/376, 236, 280, 314, 328, 334, 458, 461, 370/508; 340/3.21; 379/93.32; 709/237
See application file for complete search history.

(56) References Cited

U.S. PATENT DOCUMENTS

| | | | |
|---|---|---|---|
| 4,975,830 A | 12/1990 | Gerpheide et al. | |
| 5,521,925 A | 5/1996 | Merakos et al. | |
| 5,532,702 A | 7/1996 | Mintz | |
| 5,548,727 A | 8/1996 | Meehan | |
| 5,594,720 A | 1/1997 | Papadopoulos et al. | |
| 5,751,708 A | 5/1998 | Eng et al. | |
| 5,916,307 A | 6/1999 | Piskiel et al. | |
| 6,094,429 A | 7/2000 | Blanchette et al. | |
| 6,282,572 B1 | 8/2001 | Dahlin et al. | |
| 6,411,613 B1 * | 6/2002 | Seymour et al. | 370/347 |
| 6,584,100 B1 | 6/2003 | Ngo | |
| 6,694,470 B1 | 2/2004 | Palm | |
| 6,714,780 B1 * | 3/2004 | Antonio et al. | 455/425 |
| 6,741,579 B1 | 5/2004 | Choi et al. | |
| 6,925,068 B1 | 8/2005 | Stanwood et al. | |
| 6,944,459 B2 | 9/2005 | Parantainen et al. | |
| 6,959,009 B2 | 10/2005 | Asokan et al. | |
| 6,967,936 B1 | 11/2005 | Laroia et al. | |
| 7,054,926 B1 | 5/2006 | Abidi et al. | |
| RE39,116 E | 6/2006 | Shirani et al. | |
| 7,072,337 B1 | 7/2006 | Arutyunov et al. | |
| 7,076,204 B2 | 7/2006 | Richenstein et al. | |
| 7,082,535 B1 | 7/2006 | Norman et al. | |
| 7,177,308 B2 | 2/2007 | Ofek et al. | |
| 7,200,178 B2 | 4/2007 | Shoemake et al. | |
| 7,233,769 B2 | 6/2007 | Richenstein et al. | |

(Continued)

OTHER PUBLICATIONS

U.S. Office Action in U.S. Appl. No. 12/570,968, dated Jan. 19, 2012, 27 pages.

(Continued)

*Primary Examiner* — Michael Thier
*Assistant Examiner* — Benjamin H Elliott, IV
(74) *Attorney, Agent, or Firm* — Fish & Richardson P.C.

(57) ABSTRACT

A computer-implemented method may include receiving at a wireless device one or more beacon packets sent by a communication base station, determining a delay period at the wireless device, wherein the delay period is determined so that a delay for the wireless device is different than a delay for another wireless device, sending a first association request from the wireless device after waiting for the delay period, and establishing communication with the base station if an association response is received from the base station within a determined time period. The first association request may include information identifying the wireless device and an association code.

25 Claims, 14 Drawing Sheets

U.S. PATENT DOCUMENTS

| | | | |
|---|---|---|---|
| 7,280,501 | B2 | 10/2007 | O'Neill et al. |
| 7,400,857 | B2 | 7/2008 | Chang et al. |
| 7,518,997 | B2 | 4/2009 | Krenik et al. |
| 7,548,529 | B2 | 6/2009 | Nambirajan |
| 7,551,602 | B2 | 6/2009 | Whitman |
| 7,558,280 | B2 | 7/2009 | Hurwitz et al. |
| 7,567,813 | B2 | 7/2009 | Deschenes |
| 7,568,040 | B2 | 7/2009 | Townsley et al. |
| 7,929,491 | B2* | 4/2011 | Lim et al. ............ 370/328 |
| 8,144,639 | B1 | 3/2012 | Ghaus et al. |
| 2003/0137955 | A1* | 7/2003 | Kim et al. ............ 370/332 |
| 2004/0071125 | A1 | 4/2004 | Gross et al. |
| 2004/0179501 | A1 | 9/2004 | Marsan et al. |
| 2004/0202181 | A1 | 10/2004 | Mitchell |
| 2004/0258040 | A1 | 12/2004 | Joshi et al. |
| 2005/0037799 | A1* | 2/2005 | Braun et al. ............ 455/525 |
| 2005/0136910 | A1* | 6/2005 | Li et al. ............ 455/423 |
| 2007/0019664 | A1 | 1/2007 | Benveniste |
| 2008/0070610 | A1* | 3/2008 | Nishio ............ 455/509 |
| 2009/0041050 | A1 | 2/2009 | Hunzinger |
| 2009/0092201 | A1 | 4/2009 | Luo et al. |
| 2009/0201838 | A1 | 8/2009 | Zhang et al. |
| 2010/0150101 | A1 | 6/2010 | Ahluwalia et al. |
| 2010/0157820 | A1* | 6/2010 | Cheng et al. ............ 370/252 |
| 2010/0208667 | A1 | 8/2010 | Chun et al. |
| 2011/0117948 | A1 | 5/2011 | Ishii et al. |
| 2012/0082200 | A1* | 4/2012 | Verikoukis et al. ............ 375/227 |

OTHER PUBLICATIONS

U.S. Office Action in U.S. Appl. No. 12/570,968, dated Jul. 10, 2012, 33 pages.

U.S. Office Action in U.S. Appl. No. 12/570,741, dated Aug. 7, 2012, 23 pages.

Andrews et al. "Providing quality of service over a shared wireless link," *IEEE Communications Magazine*, 2001, 5 pages.

Bender et al. "CDMA/HDR: A bandwidth efficient high speed wireless data service for nomadic users," IEEE Communications Magazine, 2000, 38(7): 70-77.

Bennett and Zhang. "WF$^2$Q: Worst-case fair weighted fair queuing," *IEEE INFOCOM'96*, 1996, vol. 1:120-128.

Bharghavan et al. "MACAW: a media access protocol for wireless LAN's," Proceedings of the conference on Communications architectures, protocols and applications, 1994, London, United Kingdom, pp. 212-225.

Demers et al. "Analysis and simulation of a fair queuing algorithm," *ACM SIGCOMM'89*, 1989, 12 pages.

Eklund et al. "IEEE Standard 802.16: A Technical Overview of the WirelessMAN Air Interface for Broadband Wireless Access." *IEEE Commun. Mag.*, 2002, pp. 98-107.

Goyal et al. "Start-time fair queuing: A scheduling algorithm for integrated services Packet Switching Networks," ACM SIGCOMM'96, 1996, 28 pages.

Hillebrand. "GSM and UMTS, the Creation of Global Mobile Communications." (Table of Contents Only), John Wiley & Sons, ed. 2002, 6 pages.

Jalali et al. "Data throughput of cdma hdr: a high efficiency-high data rate personal communication wireless system," in *Proceedings of IEEE Vehicular Technology Conference*, 2000, vol. 3, pp. 1854-1858.

Lu et al. "Fair scheduling in wireless packet networks," *ACM MOBICOM' 98*, 1998, 12 pages.

Mouly and Pautet. "The GSM System for Mobile Communications." (Table of Contents Only), 1992, Telecom Publishing, 7 pages.

Ng et al. "Packet fair queuing algorithms for wireless networks with location-dependent errors," *IEEE INFOCOM'98*, 1998, 9 pages.

O'Hara and Petrick. "The IEEE 802.11 Handbook: A Designer's Companion," (Table of Contents Only), IEEE Press, 1999, 4 pages.

Ramanathan and Agrawal. "Adapting packet fair queuing algorithms to wireless networks," *ACM MOBICOM'98*, Oct. 1998, 9 pages.

Redl et al. "GSM and Personal Communications Handbook." (Table of Contents Only), Artech House, 1998, 12 pages.

Shakkottai and Stolyar. "Scheduling for multiple flows sharing a time-varying channel: The exponential rule," Research Paper at Bell Labs, Murray Hill, NJ, 2000, 20 pages.

Shakkottai and Stolyar. "Scheduling algorithms for a mixture of real-time and non-real-time data in HDR" in *In Proceedings of ITC-17*, Sep. 2001, pp. 793-804.

Stolyar and Ramanan. "Largest weighted delay first scheduling: Large deviations and optimality," *Annals of Applied Probability*, 2001, 11(1):1-48.

Viswanath et al. "Opportunistic beamforming using dumb antennas," *IEEE Transactions on Information Theory*, 2002, 48(6):1277-1294.

'Wireless Man Working Group-IEEE WirelessMAN 802.16', [online]. "The IEEE 802.16 Working Group on Broadband Wireless Access Standards-WirelessMAN Standards for Wireless Metropolitan Area Networks" 2012, [retrieved on May 21, 2012]. Retrieved from the Internet: URL:<http://WirelessMAN.org>. 2 pages.

U.S. Office Action in U.S. Appl. No. 12/570,825, dated Dec. 7, 2012, 27 pages.

* cited by examiner

|    |     |                |
|----|-----|----------------|
| 01 | S1  |                |
| 02 | S2  |                |
| 03 | D1  |                |
| 04 | D2  |                |
| 05 | D3  |                |
| 06 | D4  |                |
| 07 | D5  |                |
| 08 | D6  |                |
| 09 | D7  |                |
| 10 | D8  |                |
| 11 | D9  |                |
| 12 | D10 |                |
| 13 | D11 |                |
| 14 | D12 |                |
| 15 | D13 |                |
| 16 | S3  |                |
| 17 | S4  |                |
| 18 | D14 |                |
| 19 | D15 |                |
| 20 | D16 |                |
| 21 | D17 |                |
| 22 | D18 |                |
| 23 | D19 |                |
| 24 | D20 |                |
| 25 | D21 |                |
| 26 | D22 |                |
| 27 | D23 |                |
| 28 | D24 |                |
| 29 | D25 |                |
| 30 | D26 |                |
| 31 | D27 |                |
| 32 | S5  |                |

From FIG. 2B

| | | |
|---|---|---|
| 33 | S6 | |
| 34 | D28 | |
| 35 | D29 | |
| 36 | D30 | |
| 37 | D31 | |
| 38 | D32 | |
| 39 | D33 | |
| 40 | D34 | |
| 41 | D35 | |
| 42 | D36 | |
| 43 | D37 | |
| 44 | D38 | |
| 45 | D39 | |
| 46 | D40 | |
| 47 | D41 | |
| 48 | S7 | |
| 49 | S8 | |
| 50 | D42 | |
| 51 | D43 | |
| 52 | D44 | |
| 53 | D45 | |
| 54 | D46 | |
| 55 | D47 | |
| 56 | D48 | |
| 57 | D49 | |
| 58 | D50 | |
| 59 | D51 | |
| 60 | D52 | |
| 61 | D53 | |
| 62 | D54 | |
| 63 | D55 | |
| 64 | D56 | |

FIG. 2C

SCALABLE ASSOCIATION SCHEME FOR TV WHITE-SPACE MIMO WIRELESS SYSTEM

TECHNICAL FIELD

This document relates to wireless communication systems and techniques.

BACKGROUND

Modern wireless data communications provide bandwidth that allows user of wireless devices to use a number of rich mobile computing applications. For example, users of wireless devices such as smart phones can make telephone calls, receive emails, and even receive full motion audio/video broadcasts on their mobile devices. Every time a great new service is offered, users of wireless devices consume it and ask for more. As a result, the airwaves are filled with, and often packed with, data going to and from wireless computing devices.

The electromagnetic spectrum that wireless devices use for communication is treated as a precious resource. Governments control where in the spectrum particular wireless technologies can operate, and also control who can use particular portions of the spectrum (e.g., through high-cost spectrum auctions). Various mechanisms have been used to maximize the amount of data a network of wireless devices and corresponding base stations can put into a particular amount of spectrum. For example, multiplexing techniques may be used to stack multiple data streams in a single range of spectrum. Compression may also be used to transmit more data in a smaller data space.

Such techniques are at a premium when a large number of users want to use a particular communication system. Also, if a base station is to support a wide area (and thus reduce the number of base stations needed in a network), the base station will need to communicate with a large number of users at once. Such support for a large number of users who are all consuming large amounts of bandwidth can define the capability of a wireless communications system to compete.

Before wireless devices can communication application data with each other, they generally need to conduct what is sometimes known as a handshaking operation. Such an operation may involve the devices communicating their relative capabilities with each other so that subsequent communications can use a mode for which both devices are capable. For example, newer devices may be capable of communicating at higher data rates than are older devices, and the various devices may handshake to negotiate a highest mutual data rate for communicating. In other situations, a client device may indicate an initial need to a base station, and the two may communicate using that parameter until a new need is communicated.

SUMMARY

This document describes systems and techniques for providing digital data communication using multiple-input-multiple-output (MIMO) base stations and a large number of wireless devices. The communication may occur, for example, in the white-space that exist between frequency bands in the electromagnetic spectrum that have been allocated, such as the abandoned television frequencies located primarily in the upper UHF 700-megahertz band. Each base station may communicate with hundreds or thousands of wireless devices at the same time so as to provide for rich data services over a relatively large coverage area.

In one aspect, the document describes a frame structure for a wireless communications system that has slots that are always assigned to particular clients (static slots) and slots that can be dynamically allocated, so that the client or clients that need bandwidth at the moment can get the most slots for that period of time. The static slots are spaced out across the frame, so as to make the static slots more robust. The document discusses, among other things, the assignment of static slots for each client, along with dynamic allocation of additional slots as needed by each client, and the manner in which the static slots can be interleaved within the dynamic slots.

In another aspect, this document discusses mechanisms for preventing interference between wireless client computing devices that are communicating with a MIMO base station. To prevent such interference from lasting for a long time, system described below provide numbers (which can be random numbers) to the base station and the clients. Both the base station and the clients cycle through the numbers to periodically reassign slots in a frame to each of the clients— thereby shuffling the clients around relative to each other in a common frame, and thereby preventing two interfering clients from staying close to each other for a very long time.

In yet another aspect, dynamical scheduling in a TV white-space MIMO wireless system is discussed. In such an arrangement, wireless clients are allocating a portion of a frame that is communicating with a MIMO base station. The allocation occurs by looking at the channel condition between each device and the base station. Specifically, devices that have a higher quality channel are allocated additional symbols by the MIMO base station. Re-allocations are made dynamically every N frames.

The document also describes a scalable association scheme for a TV white-space MIMO wireless system. The scheme involves a form of handshake mechanism between a wireless device and a MIMO base station. Such a scheme can be difficult because the base station may be required to handshake or communicate simultaneously with hundreds or even thousands of wireless devices. Thus, the scheme starts by a MIMO base station sending out beacon packets (which include information for communicating with each antenna on the base station) and a new client receiving a beacon packet. The new client waits a random time period and then sends an association request that includes the client's MAC address, a field for CRC information, and information relating to code from the beacon packet. The client waits a timeout period for a response, and if it receives no response, it waits another time period before sending another request. This process does not use the MIMO on the base station—which makes association much simpler, and prevents it from interfering with the main MIMO communication by the base station and other wireless devices in the area.

In one implementation, a computer-implemented method for establishing electronic communications is disclosed. The method includes receiving at a wireless device one or more beacon packets sent by a communication base station, determining a delay period at the wireless device, wherein the delay period is determined so that a delay for the wireless device is different than a delay for another wireless device, sending a first association request from the wireless device after waiting for the delay period, and establishing communication with the base station if an association response is received from the base station within a determined time period. The first association request may include information identifying the wireless device and an association code.

In one aspect, the method may also involve sending a second association request if the association response is not received within the determined time period. The one or more beacon packets may identify the association code for the base station. The association code may include a code that identifies an antenna on the base station for communicating with the base station. In addition, the method may include receiving, at the wireless device, beacon packets from a plurality of different base stations. The beacon packets sent by each base station may include one or more association codes that are distinct from association codes received from the other base stations. The method may further include selecting one of the association codes in preference to the other association codes.

In one aspect, selecting the one of the association codes in preference to the other association codes may include selecting the association code from a base station having a highest signal strength at the wireless device. Selecting the one of the association codes in preference to the other association codes may include selecting the association code from a base station having a highest level of available resources. Selecting the one of the association codes in preference to the other association codes may include selecting the one of the association codes randomly. The association response may define a static slot of a repeating frame structure for communicating between the base station and the wireless device. The association response may define a sub-slot in an uplink portion of the static slot. The method may further include using data stored on the wireless device to identify a position for the sub-slot in the frame structure.

In one aspect, the method may also include identifying a repeating frame structure for communication between the electronic communication device and a target communication device, the frame structure including a plurality of slots, with each slot including an uplink portion and a downlink portion, and each uplink portion and downlink portion comprising a plurality of sub-slots, obtaining by the electronic communication device a sub-slot in an uplink portion of a static slot in the frame structure, to the exclusion of others wireless computing devices, and receiving information from which the sub-slot can be identified. The sub-slot may be associated with the first wireless device throughout a communication session. Each sub-slot in the uplink portion that is assigned to a wireless device may be assigned to a wireless device that differs from the wireless devices to which each of the other sub-slots in the uplink portion are assigned.

In another implementations, an electronic communications device is disclosed. The device includes one or more computer processors, memory in electronic communications with the one or more processors and storing instructions. The instructions when executed, perform the actions of identifying one or more beacon packets received over a wireless connection by the electronic communications device, determining a delay period so that a delay for the electronic communications device is different than a delay for electronic communications devices in a common cell with the electronic communications device, after waiting for the delay period, sending a first association request that includes information identifying the electronic communication device and an association code, and establishing communication with a target communication device if an association response is received from the target communication device within a determined time period.

In one aspect, the actions may further include sending a second association request, if the association response is not received within the determined time period. The one or more beacon packets may identify the association code for the target communication device. The association code may include a code that identifies an antenna on the target communication device for communicating with the target communication device. The actions may further include receiving, at the electronic communication device, beacon packets from a plurality of different target communication devices. The beacon packets sent by each target communication device may include one or more association codes that are distinct from association codes received from the other target communication devices. The actions may further include selecting one of the association codes in preference to the other association codes.

In one aspect, selecting the one of the association codes in preference to the other association codes may include selecting the association code from a target communication device having a highest signal strength at the electronic communication device. Selecting the one of the association codes in preference to the other association codes may include selecting the one of the association codes randomly. The association response may define a static slot of a repeating frame structure for communicating between the target communication device and the electronic communication device. The association response may define a sub-slot in an uplink portion of the static slot The actions may further include using data stored on the electronic communication device to identify a position for the sub-slot in the frame structure.

In yet another implementation, an electronic communications device is disclosed. The device includes one or more computer processors, an interface configured to identify one or more beacon packets received over a wireless connection by the electronic communications device; and means for establishing communication with a target communication device after determining a delay period that is unique to the communications device and waiting for the delay period, and sending a first association request that includes information identifying the electronic communication device and an association code.

The details of one or more embodiments are set forth in the accompanying drawings and the description below. Other features and advantages will be apparent from the description and drawings, and from the claims.

DESCRIPTION OF DRAWINGS

FIGS. 2B and 2C show another example frame organization for a wireless communications system.

Like reference symbols in the various drawings indicate like elements.

DETAILED DESCRIPTION

Figure 1:
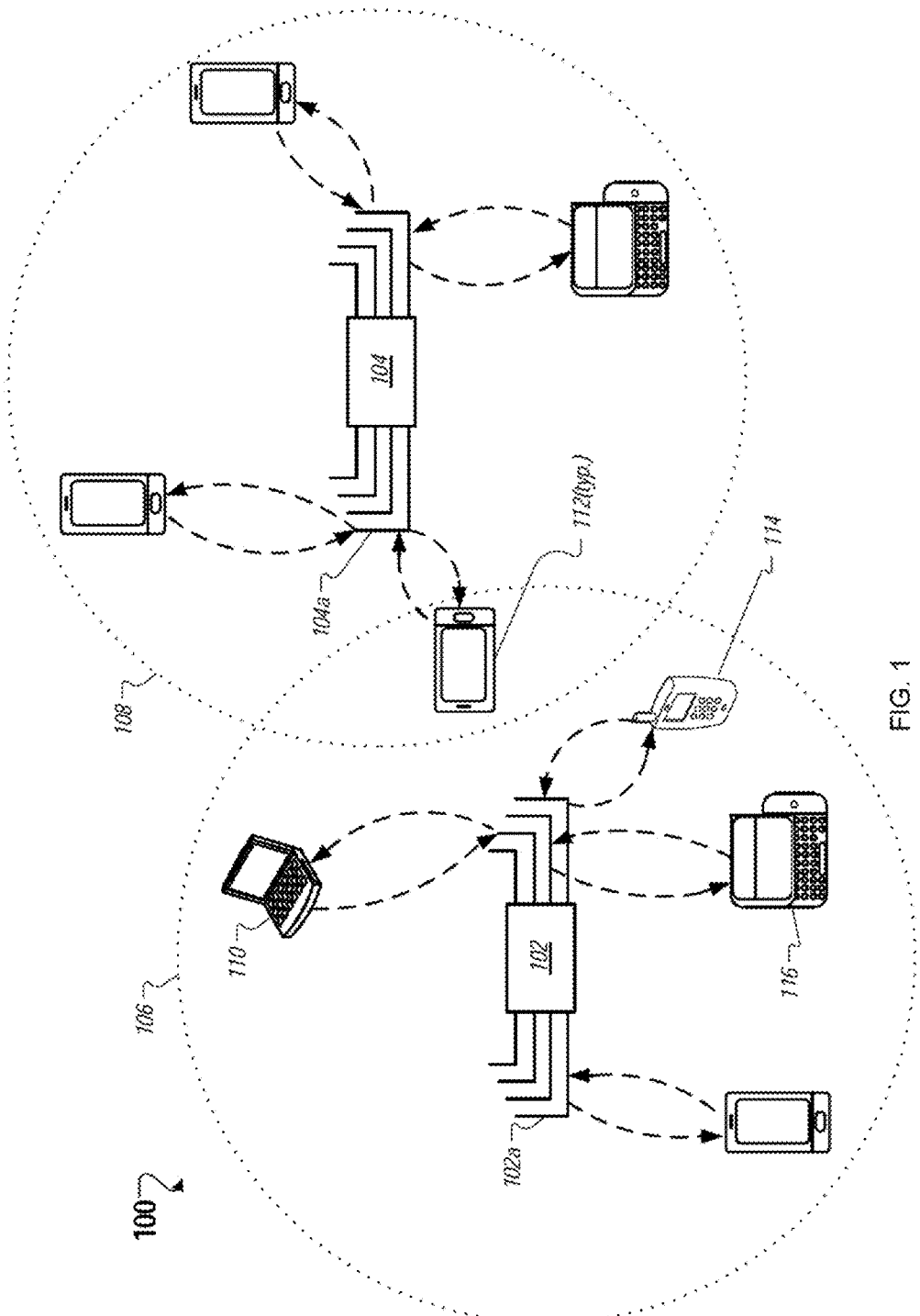
FIG. 1 shows a network of base stations and wireless clients in a wireless communications system.

FIG. 1 shows an example network 100 of base stations and wireless clients in a wireless communications system. At a very high level, the network 100 is like most broad-based wireless data networks, where various types of computing devices (which may also include communications capabilities, such as telephony functionality) connect to a network via scattered base stations that are laid out across a geography. The devices may be mobile, and thus may need to transition from one base station to another as they move. Also, the coverage of the base stations will necessarily need to overlap in some locations, so that the system 100 will need mechanisms for determining which base station, among a plurality of base stations that could serve a computing device, should in fact serve the computing device.

The network 100, in this example, includes base stations 102 and 104 that are configured to communicate with a multitude of wireless devices using a multiple-input multiple-output (MIMO) communication system. An actual network would include many more base stations spread across a geography, but only two are shown here for purposes of clarity and simplification. In some implementations, each of the base stations 102 and 104 includes multiple antennas 102a and 104a, respectively, for communicating with wireless clients over multiple separate and distinct frequency bands. Each antenna 102a and 104a can allow the base stations 102 and 104, to communicate over a different frequency. For example, if the base station 104 has 5 antennas 104a, the base station 104 would be capable of communicating over 5 different frequencies simultaneously. As another example, the base station 102 can have 40 antennas 102a, allowing the base station 102 to communicate over 40 separate frequencies simultaneously. Using multiple antennas to communicate over multiple frequencies can allow the base stations 102 and 104 to simultaneously communicate with multiple client devices without communications with a first client device interfering with communications with a second client device.

Additionally, the base stations 102 and 104 can employ a dynamic time division multiple access (TDMA) protocol in order to communicate with multiple wireless clients over a single frequency. Such communication can occur by allocating slices of time during which certain of the devices will transmit and/or receive information, while the other devices wait. In some implementations, the base stations 102 and 104 communicate with wireless clients over the so-called television white-space frequencies. In some implementations, the base stations 102 and 104 can communicate over the range of frequencies between about 50 MHz to about 700 MHz. In some implementations, the base stations 102 and 104 can communicate over the range of frequencies between about 54 MHz to about 806 MHz. In some implementations, the base stations 102 and 104 can communicate over the range of frequencies between about 698 MHz to about 806 MHz. In some implementations, each of the base stations 102 and 104 can communicate with up to 10,000 client devices.

The base stations 102 and 104 are configured to communicate with a variety of wireless devices. For example, the base station 102 can communicate with personal computers, laptop computers (e.g. computer 110), cellular phones (e.g. phone 114), including smart phones (e.g. smart phone 116), personal digital assistants (PDAs), pagers, video game consoles, and other wireless computing devices such as netbooks. In some implementations, a client device, such as the computer 110, can have multiple antennas. Having multiple antennas allows the computer 110 to communicate over multiple frequencies. In some implementations, the base station 102 can communicate with the computer 110 over multiple frequencies simultaneously. For example, a first antenna 102a of the base station 102 can communicate with a first antenna of the computer 110 at a frequency of 500 MHz and a second antenna 102a of the base station 102 can communicate with a second antenna of the computer 110 at a frequency of 600 MHz. By communicating using different antennas, the throughput of data sent between the computer 110 and the base station 102 can be increased over comparable implementations in which the computer 110 communicates with the base station 102 with one antenna. In some implementations, a client device can have more than two antennas to allow the client device to communicate with a base station using two antennas simultaneously. For example, the smart phone 116 can have five antennas to allow the smart phone 116 to communicate with the base station 102 using up to 5 antennas in order to increase throughput by up to five times. In some implementations, the base stations 102 and 104 communicate with each client device using one antenna only.

Each of the base stations 102 and 104 can communicate with client devices located within a geographic area around the respective base station, where the area is nominally defined as a circle, but may vary from a circle because of signal interference (e.g., weather, geographic barriers, buildings, etc.). For example, the base station 102 can communicate with devices within a geographic area 106 and the base station 104 can communicate with devices within a geographic area 108. In some implementations, each base station 102 and 104 can communicate with client devices located within a designated radius of each base station (e.g. a 12 km radius). In some implementations, the size of a geographic area for a base station depends on the transmission power of the base station. For example, the base station 102 can have a transmission power of 7 W to allow the base station 102 to communicate with client devices within a 10 km radius of the base station 102. In some implementations, the base stations 102 and 104 can have transmission powers in the range of 3 W to 12 W. In some implementations, the geographic areas 106 and 108 can have radiuses in the range of 1 km to 20 km.

In some implementations, a particular client device can be located simultaneously within geographic coverage areas for multiple base stations. For example, a wireless device 112 is located within the geographic area 106 and the geographic area 108. In such circumstances, the wireless device 112 is capable of communicating with the base station 102 or the base station 104 (or it could communicate with both). In some implementations, the wireless device 112 can elect to associate with the base station 102 or 104 that has the strongest signal at the location of the wireless device 112. For example, if the wireless device 112 receives a signal from the base station 104 that is stronger than a signal received by the wireless device 112 from the base station 102, the wireless device 112 can associate with the base station 104. In some implementations, the wireless device 112 can elect to associate with the base station 102 or 104 that has the best signal-to-noise ratio.

Because the wireless device 112 is located within both the geographic area 106 and the geographic area 108, both of the base stations 102 and 104 can receive communications from the wireless device 112. In some implementations, if the wireless device 112 sends a signal (e.g. a pilot signal) intended for the base station 104, the base station 102 will also receive the signal. Because the signal is intended for the base station 104, the base station 102 can interpret the signal as interference and identify the wireless device 112 as an interference source.

The base station 102 can determine a transfer function for the wireless device 112. For example, the base station 102 can derive a transfer function based on a pilot signal received from the wireless device 112 and data received from the wireless device 112. For example, the base station 102 can receive a pilot signal $P_A$ and data $D_A$ from the wireless device 112, and use this information to formulate a transfer function $H_A$. The base station 102 can then transmit the transfer function to the base station 104. The base station 104 can use the transfer function to reduce the interference from the base station 102 when the base station 104 sends data to the wireless device 112. For example, if the original data that the base station 104 intends to transmit to the wireless device 112 is $D_B$; the base station 104 can use the interference information received from the base station 102, to determine the data that is actually transmitted of $(D_B - H_A * D_A)$. In some implementations, the base station 102 sends a transfer function to the base station 104 so that the base station 104 receives the transfer function before the base station 104 transmits data to the wireless device 112.

This method can be used when communication with a client device is passed off from a first base station to a second base station. For example, the wireless device 112 can be a cellular telephone located within a moving car. The wireless device 112 may originally be positioned within the geographic area 106 and communicate with the base station 102. As the wireless device 112 moves, it travels into the region in which the geographic areas 106 and 108 intersect. As the wireless device 112 moves further into the geographic area 108, the base station 102 can transmit a transfer function associated with the wireless device 112 to the base station 104. The base station 104 can then use this transfer function to communicate with the wireless device 112 and to transmit data to the wireless device 112. In some implementations, when communication with a client device is transferred from a first base station to a second base station, all information (e.g. data) sent or received to or from the client device by the first base station must be transmitted by the first base station to the second base station. This represents at least an N-fold increase in the amount of information required per base station (where N is the number of coordinating base stations that are in communication with the client).

As noted above, the base stations 102 and 104 can use a time division multiple access (TDMA) protocol to communicate with multiple client devices over a single frequency band. Communications within this structure can occur in repeating structures known as frames of information, where each frame may have a defined make-up. For example, a frame may have header information and a payload, and may have areas, such as payload areas, in which particular devices in the system 100 are permitted to transmit, and other areas in which they are required to wait and listen. The general structure and function of frames is well-known.

Transmission time in the network 100 can be divided into uplink and downlink times. In some implementations, the amount of time devoted to uplink and downlink can be equal. In other implementations, time can be split between uplink and downlink times using a relatively arbitrary ratio. For example, two thirds of time can be allocated for uplink time and one third of time can be allocated for downlink time. If the geographic areas 106 and 108 are significantly large enough (for example, over 8 km in radius), time can be lost during uplink and downlink times due to the speed-of-light. In particular, a base station may have to wait, doing nothing, while a message travels toward it from a distant wireless device because if it did not keep such a period open for receipt of information, it would miss the front end of a message sent from a nearby wireless device. Due to the loss of at least some time due to speed-of-light, having uplink or downlink portions of time that are too short can lead to increased inefficiency. In some implementations, having uplink or downlink portions of time that are too long can increase latency of signals sent within the network 100.

Figure 2A:
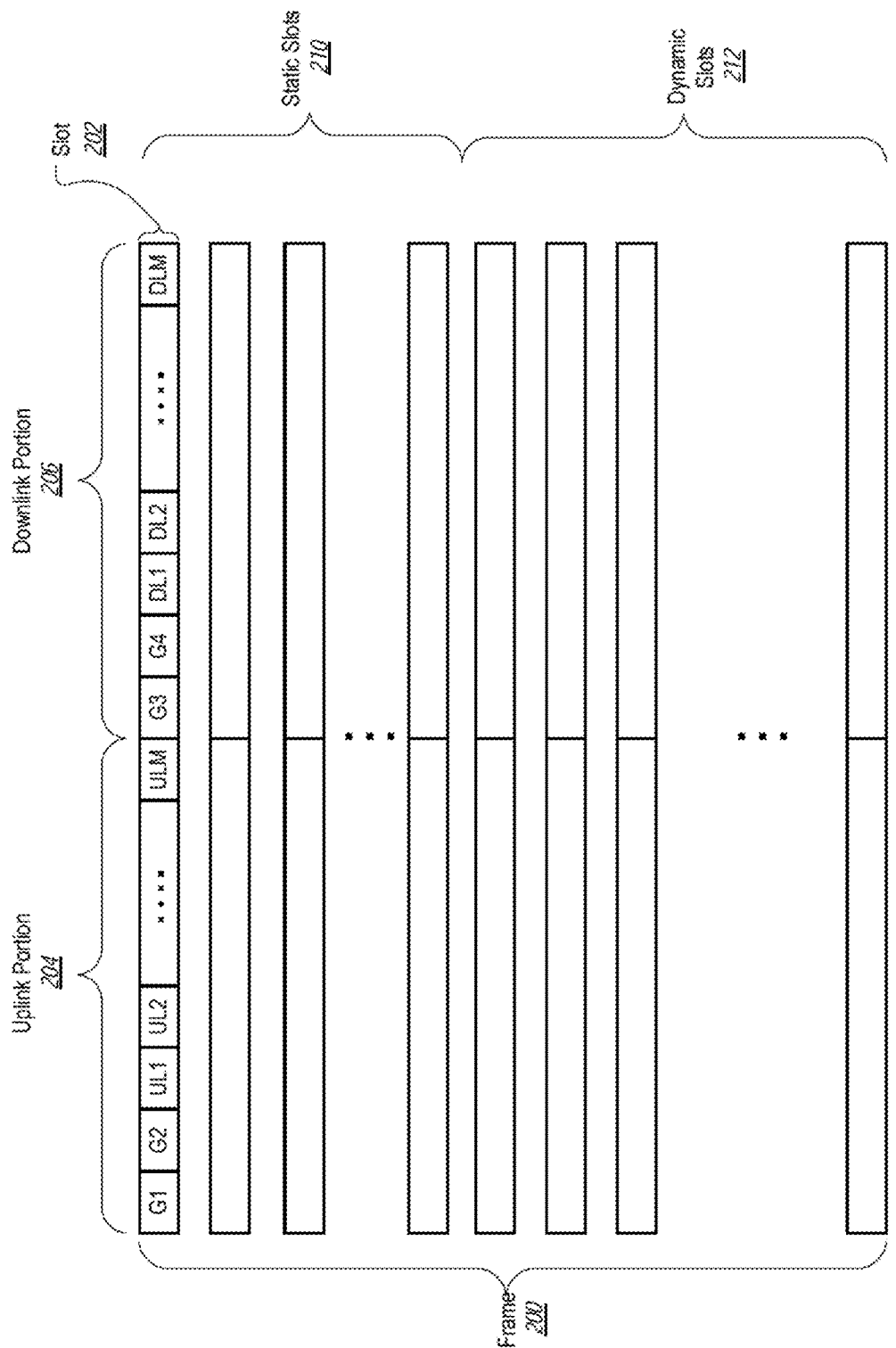
FIG. 2A shows an example frame organization for a wireless communications system.

FIG. 2A shows an example communication time frame 200 organization for a wireless communications system, such as, for example, the network 100 shown in FIG. 1. The communication time frame 200 is an example of how transmission time can be divided for a single transmission frequency band for a particular base station. Frames are constructs whose defined structure is understood by both wireless devices and base stations, so that each device knows when it is allowed to communicate and what it is supposed to communicate during a particular time slice. Frames generally repeat over-and-over every second, so that a device may have an opportunity to communicate multiple times each second, as its associate frame cycles through. Frames can be static, in that they can also have the same definition, i.e., a particular device may always have a certain time period or number of bits to upload data, or they can be dynamic and thus change over time, such as by allocating larger portions of a frame to devices that are currently the most active (e.g., running streaming video applications), and smaller portions to devices that are less active (e.g., simply pass basic textual data).

Generally, a frame such as communication time frame 200 is divided into a plurality of slots 202. The slots represent particular slices of time within the slice of time represented by the frame. Thus, although the slots 202 are shown for clarity in a number of stacked rows in FIG. 2A, they would in reality be a number of digital values passing out of one device or into another device continuously over time. Thus, for example, the slot 202 in the upper left corner of the frame 200 would be the first slot to pass, and the slot in the lower right corner would be the last to pass. After that, a next frame would be passed, starting with the slot 202 shown in the upper left corner of the figure. This process would generally repeat continuously for many millions or billions of slots and frames.

In one example, the communication time frame 200 can be divided into sixty-four slots 202. As another example, the communication time frame 200 can be divided into thirty-two slots 202. In some implementations, each of the slots 202 is of equal length, although this is not necessarily the case in every implementation. Each slot 202 in this example is divided into an uplink portion 204 and a downlink portion 206. The uplink portion 204 of each slot 202 is reserved for transmissions from client devices to a base station. For example, referring to FIG. 1, the uplink portion 204 of each slot 202 can be reserved for the computer 110, the phone 114, the smart phones 116, and other client devices to transmit signals to the base station 102. The downlink portion 206 of each slot 202 is reserved for transmissions from the base station to client devices. For example, referring to FIG. 1, the base station 102 transmits data to client devices during the downlink portion 206 of each slot 202.

In some implementations, each slot 202 is divided equally between uplink and downlink portions 204 and 206 with each making up half of the slot 202. In some implementations, either the uplink or downlink portion 204 or 206 can be greater than the other.

In some implementations, the uplink portion 204 and downlink portion 206 of each slot 202 is further divided into a plurality of sub-slots or symbols. For the rest of this description, these sub-divisions of each slot will be referred to as sub-slots even though these sub-divisions can be interchangeably referred to as sub-slots or symbols. Multiple clients can share a frame so that a base station can handle many more clients at one time, and thus each client can be assigned certain sub-slot positions for their transmission. For example, as shown in FIG. 2, the uplink portion 204 can be divided into a number of sub-slots G1, G2, and UL1 through ULM and the downlink portion 206 can be divided into a number of sub-slots G3, G4, and DL1 through DLM. In this example, the first two sub-slots of both the uplink and downlink portions 204 and 206 serve as guard sub-slots G1, G2, G3 and G4. During the downlink portion 206, no data is transmitted during guard sub-slots G3 and G4, so as to allow for different arrival times of data transmitted by the base station to client devices due to propagation delay. During the uplink portion 204, guard sub-slots G1 and G2 are reserved to correct for propagation delay and to protect pilot transmissions of client devices received by the base station (the transmission of pilot signals will be discussed in greater detail below).

The remaining sub-slots of the uplink portion 204 are uplink sub-slots UL1 through ULM. Each uplink sub-slot is dedicated to receiving an uplink transmission from a single client device. Therefore, the base station can receive uplink transmission from up to M different client devices in a single slot 202.

The remaining sub-slots of the downlink portion 206 are downlink sub-slots DL1 through DLM. Each downlink sub-slot is dedicated to transmitting a downlink transmission to a single client device, thus allowing the base station to send downlink transmissions to as many as M different client devices in a single slot 202. In some implementations, more than one uplink or downlink sub-slot can be allocated for communications with a single client device. For example, referring to FIG. 1, four uplink sub-slots within a single slot 202 can be allocated for receiving transmissions from the phone 114. Allocating multiple uplink or downlink sub-slots within a single slot 202 to a particular client device can increase throughput for the client device, while also decreasing the total number of client devices that can communicate with the base station during a single slot 202.

In the example depicted in FIG. 2A, the uplink and downlink portions 204 and 206 of each slot 202 have an equal number of sub-slots (2 guard sub-slots each plus M uplink or downlink sub-slots). In some implementations, either the uplink portion 204 or the downlink portion 206 can have more sub-slots than the other. In some implementations, the duration of each sub-slot is equal. In some implementations, some sub-slots can have longer durations than others.

The variable M can have a wide range of integer values. For example, the value of M can be an integer between 2 and 128. As another example, the value of M is 30, therefore each uplink and downlink portion 204 and 206 includes 32 sub-slots total. In this example, each slot 202 is made up of a total of 64 sub-slots. In some implementations, the duration of each sub-slot can be about 17 µs. In implementations in which the value of M is 30 and the duration of each sub-slot is 17 µs, the time for each slot 202 is about 1.08 ms. In such implementations in which the communication time frame 200 also includes 64 slots 202, the total time for the communication time frame 200 is about 69 ms. In some implementations, the duration of each sub-slot can be between about 7 µs and 28 µs. In some implementations, the number of slots within a frame and the number of sub-slots within each slot 202 can be adjusted depending on system requirements (e.g. delay, bandwidth, etc.). For example, the value of M can be adjusted depending on bandwidth requirements of a particular system.

In some implementations, the uplink and downlink portions 204 and 206 can include more or fewer guard sub-slots. For example, each uplink and downlink portion 204 and 206 can have one guard sub-slot. In such circumstances, the value of M can be 31, thereby making the total size of each uplink and downlink portion 204 and 206 32 sub-slots. In some implementations, the uplink and downlink portions 204 and 206 can have no guard sub-slots. In some implementations, the uplink portion 204 can have more or fewer guard sub-slots than does the downlink portion 206.

Still referring to FIG. 2A, in accordance with some implementations, the communication time frame 200 can be divided into static slots 210 and dynamic slots 212, with a portion of the slots 202 designated as static slots 210 and a portion of the slots 202 designated as dynamic slots 212. The static slots 210 are set aside so that each client device in communication with a base station is allocated at least one (or some other static value) uplink sub-slot and at least one downlink sub-slot per frame. For example, if the value of M is 30 and the total number of clients communicating with a base station is 120, the total number of static slots 210 required is four, to allow for each client to be assigned one uplink sub-slot within a static slot 210 (i.e., a static sub-slot) and one downlink sub-slot within a static slot 210 per frame. Following this example, if the base station begins communicating with one additional client, therefore bringing the total number of client devices to 121, a fifth slot 202 would be designated as a static slot 210 in order to guarantee at least one static uplink sub-slot and one static downlink sub-slot for each client device. In some implementations, one static uplink sub-slot per frame is assigned to each client device that communicates with a base station; however, each client device may not be guaranteed a downlink sub-slot in every frame.

In some implementations, a static schedule for static communication with a base station can be assigned to each client device that is in communication with the base station. This process can ensure that each client has a location in the frame to perform basic communication, such as for housekeeping (e.g., no notify the base station that the client would like access to additional dynamic slots). The static schedule indicates to a client device a static uplink sub-slot in which the client device can transmit communications to the base station. When a new client device associates with the base station, the base station can assign a static schedule to the new client device. The new client device can use a static uplink sub-slot specified by static schedule to transmit a pilot signal and data in every frame.

A static schedule can specify a static uplink sub-slot for a client device by specifying a slot 202 number and a sub-slot ID. The static schedule may be applied, as discussed in more detail below, by a base station that is allocating space in one of its frames, to various wireless devices with which it is communicating or beginning to communicate. For example, a static schedule for a client device can indicate that the static uplink sub-slot for the device is sub-slot UL7 within the third static slot 210. This can be represented as coordinates (3, UL7) where the first coordinate refers to the slot 202 number within the communication time frame 200, and the second coordinate refers to the sub-slot within the slot 202. In some implementations, it can be assumed that a static schedule specifies an uplink sub-slot. In such implementations, only the number of the uplink sub-slot is required to identify the sub-slot. Therefore, following the above example, the coordinates for the static uplink sub-slot can be expressed as (3, 7) to indicate the seventh uplink sub-slot of the third static slot 210.

The static schedule for a client device can be determined using an algorithm. For example, let the number of client devices in communication with a base station at a particular frequency be C. Additionally, let $SL_{static}$ represent the static slot 210 indicated by a static schedule, and let $SSL_{static}$ represent the sub-slot indicated by the static schedule. The static slot 210 for a new client device that has just begun communication with a base station at a particular frequency (i.e., the $C^{th}$ client device communicating at that frequency) can be calculated using the following equation:

$$SL_{static} = \text{ceil}(C/M)$$

In other words, the static slot 210 of the static schedule is calculated by dividing the total number of client devices communicating at that frequency by the total number of uplink sub-slots in a slot 202. The result is then rounded up to the nearest integer. For example, if M=30 and the total number of client devices communicating at a particular frequency is 64, the static slot 210 assigned to the $64^{th}$ client device is the third static slot 210 (ceil(64/30)=3). Continuing with this example, the static sub-slot for the new client device can be calculated using the following equation:
ti $SSL_{static} = (C \% M)$
In other words, the static sub-slot of the static schedule is calculated by determining the remainder of the total number of clients divided by the total number of uplink sub-slots in a slot 202. For example, if M=30 and the total number of client devices communicating at a particular frequency is 64, the static sub-slot assigned to the 64th client device is uplink sub-slot number 4 of the third static slot 210 (64%30=4).

Note that a special condition occurs when the remainder of C divided by M is zero (i.e., C is a multiple of M). In such situations, the new client device is assigned to the last uplink sub-slot (i.e., the Mth sub-slot) of the assigned static slot 210. Continuing with this example, the above equations can be modified to calculate a static schedule for a new client device in a system in which devices are communicating at a plurality of frequencies. Let C be the total number of client devices communicating with a base station, and let A be the number of antennas that the base station has (i.e., the total number of different frequencies the base station is capable of communicating at).

The static slot 210 for a new client device that has just begun communicating with a base station (i.e., the Cth client device) can be calculated using the following equation:

$$SL_{static} = \text{ceil}(C/(M*A))$$

In other words, the static slot 210 of the static schedule is calculated by dividing the total number of client devices that are communicating with the base station by the total number of uplink sub-slots in a slot 202, times the total number of antennas. The result is then rounded up to the nearest integer. For example, if M=30, the total number of client devices is 273, and the total number of antennas is 4, the static slot 210 assigned to the $273^{rd}$ client device is the third static slot 210 (ceil(273/(30*4))=3).

Continuing with this example, the static sub-slot for the new client device can be calculated using the following equation:

$$SSL_{static} = \text{ceil}((C \% (M*A))/A)$$

In other words, the static sub-slot of the static schedule is calculated by determining the remainder of the total number of clients divided by the total number of uplink sub-slots in a slot 202, times the total number of antennas. The result is then divided by the total number of antennas and rounded up to the nearest integer. For example, if M=30, the total number of client devices is 273, and the total number of antennas is 4, the static sub-slot assigned to the $273^{rd}$ client device is uplink sub-slot number 9 of the third static slot 210 (ceil((273%120)/4)=9). Note that a special condition occurs when the remainder of C divided by M times A is zero (i.e., C is a multiple of M times A). In such situations, the new client device is assigned to the last uplink sub-slot (i.e., the $M^{th}$ sub-slot) of the assigned static slot 210.

Note that in the above example, up to four different client devices can be assigned to the same static slot 210 and static sub-slot because the base station has four antennas, thus allowing up to four different client devices to communicate with the base station simultaneously. Client devices that communicate with a single base station simultaneously can be collectively referred to as a MIMO group. The maximum size of a MIMO group is generally equal to the number of antennas that the base station has for communicating with clients (i.e., A in the above example).

In some implementations, a particular antenna or communication frequency can be assigned to a client device. An antenna assignment for a new client device can be determined using the following equation:

$$\text{AntennaID} = (C \% (M*A)) \% A$$

In other words, the antenna assignment is calculated by determining the remainder of the total number of clients divided by the total number of uplink sub-slots in a slot 202, times the total number of antennas. The result is then divided by the total number of antennas. The remainder of this division is the antenna assignment For example, if M=30, the total number of client devices is 273, and the total number of antennas is 4, the antenna assigned to the 273rd client device is antenna number 1 ((273%120)%4=1). Note that a special condition occurs when the result is zero. In such situations, the new client device is assigned to the last antenna (i.e., the Ath antenna).

In some implementations, a static schedule can be transmitted to a client device by a base station when communication between the client device and the base station is first initiated. In some implementations, the client device uses the static uplink sub-slot that is identified by the static schedule to send data and pilot signals to the base station in every frame. In some implementations, the client device uses the static uplink sub-slot identified by the static schedule to send data and pilot signals to the base station in a first frame, and will use different uplink sub-slots within the static slot identified by the static schedule in subsequent frames. In some implementations, the client device, the base station, or both, can perform computations in order to identify an uplink sub-slot of the assigned static slot during which the client device will transmit signals to the base station.

In some implementations, both the base station and the client device will locally store an identical plurality of random number arrays (where the randomness need not be literally random, but merely sufficiently varied to permit proper operation of the system). For example, the total number of random number arrays can be equal to the number of antennas of the base station. Following the above example, the number of random number arrays would be A. Both the base station and the client device would then store random number arrays $RN_1, RN_2, RN_3, \ldots, RN_A$.

In some implementations, the random number arrays can be pre-loaded into a memory of the base station and a memory of the client device. In some implementations, the random number arrays can be sent to the client device from the base station during an association, or handshaking, procedure. In such an example, let S be the total number of random numbers in each random number array in this example. In some implementations, S is a significantly large number. Each random number in the random number arrays is an integer from the set of integers that spans from 1 to M (recall that M is the number of uplink sub-slots in a slot 202). A random number array that corresponds to the antenna assigned to the client device is selected. For example, if the client device is assigned to an antenna having an AntennaID of 3, the random number array $RN_3$ is selected.

The base station can then provide an offset number OFFSET to the client device. In some implementations, the offset number can be transmitted to the client device along with the static schedule for the client device. Let F in such a situation be the number of the frame for which a sub-slot index is being determined. Recall that $SSL_{static}$ represents the static sub-slot assigned to the client device that is identified by the static schedule. The sub-slot index for the $F^{th}$ frame can be determined by selecting the $k^{th}$ element in the random number array $RN_{AntennaID}$ where k is calculated using the following equation:

$$k=(OFFSET+SSL_{static}+(F-1))\% S$$

Following this example, if the originally-assigned sub-slot index is 12, the frame number is 8, the offset is 5, the AntennaID is 3, and the total number of random numbers in each random number array is 10,000, then k is equal to 24 (5+12+7) and the index of the static sub-slot that the client device will use to communicate in the eighth frame is the 24th element of $RN_3$. In some implementations, the offsets are assigned to client devices by the base station such that various client devices communicating with the client device at the same frequency will never calculate the same sub-slot index for the same frame.

The calculations for determining a sub-slot during which a client device will communicate in a particular frame can be calculated by both the client device and the base station. Because the client device and the base station both store identical random number arrays, and the client and base station can both perform the same calculations, both the client and the base station can determine the index of a sub-slot for the client device for each frame without additional transmissions for communicating the sub-slot for each frame. In some implementations, the calculations for determining a sub-slot during which a client device will communicate in a particular frame are calculated by the base station and transmitted to the client device for each frame. For example, the base station can send coordinates indicating a static slot 210 and a sub-slot within the static slot 210 for each frame. In some implementations, a particular client device will be assigned to the same static slot 210 in every frame, and only the sub-slot assigned to the client device within the static slot 210 will change from frame to frame. In some implementations, the static slot 210 assigned to a client device can change from frame to frame.

In some implementations, assigning a different static sub-slot to each client device for each frame leads to MIMO groups for the system that change for each frame. For example, referring to FIG. 1, the computer 110 can communicate with the base station 102 during the same static slot and sub-slot as the phone 114 during a first frame. The computer 110 and the phone 114 thus constitute a MIMO group for the first frame. In a second frame, the computer 110 can be assigned a different static sub-slot than the phone 114. In the second frame, the computer 110 and the smart phone 116 can be assigned to the same static slot and sub-slot, and thus constitute a MIMO group. It can be seen from the above example that randomly assigning a different static sub-slot to each client device for each frame causes MIMO groups to be rearranged from frame to frame.

The rearrangement of MIMO groups can provide the advantage of reducing persistent interference between client devices in a communication system. For example, referring to FIG. 1, the phone 114 may cause a high level of interference for the smart phone 116 when the two devices are transmitting signals simultaneously. If the phone 114 and the smart phone 116 are assigned to the same static slot and sub-slot (and therefore in the same MIMO group), the phone 114 may cause a high level of interference for communications between the smart phone 116 and the base station 102. In such situations, the base station 102 may be unable to accurately receive data transmitted by the smart phone 116. If the smart phone 116 and the phone 114 (which itself may be a different style of smart phone) are in the same MIMO group for every frame, communications between the smart phone 116 and the base station 102 may experience interference from the phone 114 in every frame. However, if MIMO groups are rearranged for each frame, the interference caused by the phone 114 can be decreased since the phone 114 and the smart phone 116 will only be in the same MIMO group for a small number of frames (1 out of every M frames, on average). During the rest of the frames, the phone 114 and the smart phone 116 will be in different MIMO groups. When the phone 114 and the smart phone 116 are in different MIMO groups, the phone 114 and the smart phone 116 are assigned to different sub-slots, and therefore are not communicating with the base station 102 at the same time.

Referring back to FIG. 2A, in some implementations, the slots 202 within the communication time frame 200 that are not designated as static slots can be indicated as dynamic slots 212. For example, if the communication time frame 200 has a total of 64 slots 202 and 8 of the slots 202 are designated as static slots 210, the remaining 56 slots 202 can be designated as dynamic slots 212. Uplink and downlink sub-slots within each dynamic slot 212 can be dynamically allocated among client devices based on traffic load and channel conditions.

Uplink and downlink sub-slots within dynamic slots 212 can be referred to as dynamic sub-slots. Dynamic sub-slots can be allocated to client devices based on throughput requirements of client devices. For example, a first client device that is transmitting voice communication data may require greater throughput than a second client device that is transmitting text based communication data. In this example, the first client device can be allocated a greater number of dynamic sub-slots within in the communication time frame 200 than is the second client device, because the throughput needs of the first client device are greater than the throughput needs of the second client device.

In some implementations, a client device can be assigned no more than one uplink sub-slot in a single slot 202. Client devices can also be assigned multiple uplink sub-slots in a single slot 202. Alternatively, a client device can be assigned no more than one downlink sub-slot in a single slot 202, or client devices can be assigned multiple downlink sub-slots in a single slot 202. In some implementations, a client device can be assigned no more than one uplink sub-slot in a single slot 202 and also be assigned multiple downlink sub-slots within a single slot 202.

A base station can also send a dynamic schedule to a client device or devices, either alone or in combination with a static schedule. A dynamic schedule can include slot and sub-slot coordinates as described above for static schedules. In some implementations, a dynamic schedule can include an indication of one or more dynamic slots 212 within a frame, but not sub-slots within the indicated slots. In some implementations, the base station and client device can individually determine the index of a sub-slot that will be used for communication within an indicated dynamic slot 212. For example, a base station can select three dynamic slots 212 within a frame to assign to a client device. The base station can send a dynamic schedule to the client device that indicates the three dynamic slots 212. The client device will then calculate an uplink sub-slot for each indicated dynamic slot 212 during which to transmit data to the base station 112. In some implementations, the method described above for determining a sub-slot within a static slot 210 for a particular frame can be used to determine a sub-slot within a dynamic slot 212 for a particular frame.

In some implementations, a different method may be used for determining a sub-slot within a dynamic slot 212 for a particular frame. A client device may also determine more than one uplink sub-slot for each indicated dynamic slot 212. In certain circumstances, the base station will only transmit a dynamic schedule during a static downlink sub-slot.

In some implementations, downlink sub-slots can be assigned based on a schedule as described above for uplink sub-slots. The downlink schedule can be transmitted by a base station to each client device. Client devices within a network can be prepared to receive transmissions from the base station during all downlink portions 206. In such implementations, the base station need not indicate a downlink schedule to each client device. The base station can simply transmit signals intended for various client devices and the intended recipient devices can receive the signals. For example, the base station may encrypt transmissions using a different key for each client device and each client device can posses a different key for decrypting received transmissions. In such situations, only an intended recipient device will be able to decrypt a particular transmission. In some implementations, the base station can transmit signals to a single client device during multiple downlink sub-slots of a single slot 202. In some implementations, the downlink channel of a communication system is a broadcast channel, and the uplink channel is a single-access channel.

Still referring to FIG. 2A, for each sub-slot, a pilot transmission can be overlapped with a data transmission. Each data sub-slot can be preceded by a pilot sub-slot, for example. Therefore, the start times for pilot transmissions is different from the start time for data transmissions. For example, a client device can transmit a pilot signal immediately before the sub-slot time for the corresponding data signal for the client device. In other words, the N+1th pilot sub-slot occurs at the same time as the Nth data sub-slot.

The communication time frame structure depicted in FIG. 2A represents airtime usage at a base station. Due to propagation delay, the sub-slot timing will be slightly different for each client device depending on the distance of each client device from the base station. To align received signals to a proper sub-slot time, client devices transmit their pilot and data signals earlier to account for propagation delay. This timing adjustment allows a client device to adjust its pilot and data signal transmission timing so that its transmissions arrive at the base station aligned to the proper sub-slot time. In some implementations, a base station calculates the time adjustment values for each client device and sends the time adjustment values to the corresponding client devices.

FIGS. 2B and 2C show another implementation of a frame organization for a wireless communications system. A frame 250 can be similar to the frame 200 of FIG. 2A, and is provided in part to show how static and dynamic slots can be interleaved in a frame, so that not all of the static slots are at the beginning, or top, of the frame. Such interleaving of static and dynamic slots can have the benefit, in certain implementations, of reducing effects of interferences caused by one or more periodical noise sources. The interleaving of static and dynamic slots can also provide the benefit of separating static slots to improve system robustness.

FIGS. 2B and 2C together show a single frame 250 having 64 slots. Each slot includes an uplink and a downlink portion. Each slot has 64 sub-slots, with the uplink portion of each slot having 32 sub-slots and the downlink portion of each slot having 32 sub-slots. In some implementations, the first two sub-slots of each uplink and downlink portion can be designated as guard slots as described above with reference to FIG. 2A. In some implementations, only the first sub-slot of each uplink and downlink portion is designated as a guard slots. In other implementations, none of the sub-slots are designated as guard slots.

A portion of the slots can be designated as static slots and the remaining slots can be designated as dynamic slots. For example, slots S1 and S2 are designated as static slots. In the example shown in FIGS. 2B and 2C, eight of the 64 slots are designated as static slots with the first slot S1 designated as the first static slot, the second slot S2 designated as the second static slot, the 16th slot S3 designated as the third static slot, the 17th slot S4 designated as the fourth static slot, the 32nd slot S5 designated as the fifth static slot, the 33rd slot S6 designated as the sixth static slot, the 48th slot S7 designated as the seventh static slot, and the 49th slot S8 designated as the eighth static slot. The remaining 56 slots are designated as dynamic slots.

The number of slots within a frame that are designated as static slots can be determined based on the number of client devices within a communication system at a particular frequency or frequency range. For example, in an implementation in which each slot includes 30 uplink sub-slots, if a total of 103 clients are communicating with a base station, the base station would need to designate four slots as static slots in order to ensure that each client is assigned a static uplink sub-slot.

In the example depicted in FIGS. 2B and 2C, the frame 250 includes eight static slots. If 30 sub-slots in each slot are used as uplink sub-slots and 30 sub-slots in each slot are used as downlink sub-slots, a base station using the depicted frame structure can support up to 240 client devices per antenna while still guaranteeing each client device at least one static uplink sub-slot and one static downlink sub-slot per frame. If the base station has a total of 40 antennas, the base station is capable of supporting up to 9,600 client devices while still guaranteeing each client device at least one static uplink sub-slot and one static downlink sub-slot per frame.

In some implementations, each client device within a communication system is assigned exactly one uplink sub-slot within a static slot and one downlink sub-slot within a static slot per frame. Assigning static uplink and downlink sub-slots to each client device ensures that each client device can communicate with a base station of the communication system during each frame, such as to perform housekeeping tasks. This allows each client device to send pilot and data signals to the base station and to receive data, time adjustment, or scheduling information from the base station during each frame. Sub-slots within the dynamic slots can be allocated to various client devices by the base station. In some implementations, the base station can allocate dynamic sub-slots based on channel interference, SNR, or bandwidth requirements for client devices.

In some implementations, a client device can request dynamic sub-slots by sending a request to a base station, where the request indicates a requested number of uplink sub-slots to satisfy traffic requirements of the client device. For example, a video streaming application on the device may be programmed to have the device generate a particular form of request. A dynamic sub-slot request can be transmitted during a static uplink sub-slot as one example. A dynamic sub-slot request can alternatively be transmitted during any uplink sub-slot assigned to a particular client device.

A dynamic sub-slot request can include traffic information for the client device, such as maximum and minimum bandwidth requirements and delay constraints. In such implementations, the base station can allocate a suitable number of sub-slots for each client based on the traffic load and channel conditions for each client. In some implementations, a client device can specify a specific number of requested uplink sub-slots for a frame in a dynamic sub-slot request.

A base station can send a grant message to a client device, in response to a request, to indicate which dynamic uplink sub-slots (if any) are assigned to the client device for a particular frame. In some implementations, the grant message includes a bit mask to indicate which dynamic slots are assigned to the client device. For example, the base station can send a 16-bit mask to indicate dynamic slot assignments for the next 16 dynamic slots. In this example, a bit mask of 1001 0010 1000 1010 can indicate that a client device receiving the bit mask can transmit during the $1^{st}$, $4^{th}$, $7^{th}$, $9^{th}$, $13^{th}$, and $15^{th}$ dynamic slots after the slot in which the client device received the schedule. In some implementations, the specific sub-slot for each identified dynamic slot can be determined as described above with reference to FIG. 2A.

In some implementations, a client device will transmit during a pre-specified sub-slot for each indicated dynamic slot, where the pre-specified sub-slot is the same from frame to frame. A grant message can indicate assigned dynamic uplink sub-slots by providing a slot index and a sub-slot index for each assigned sub-slot.

Figure 2D:
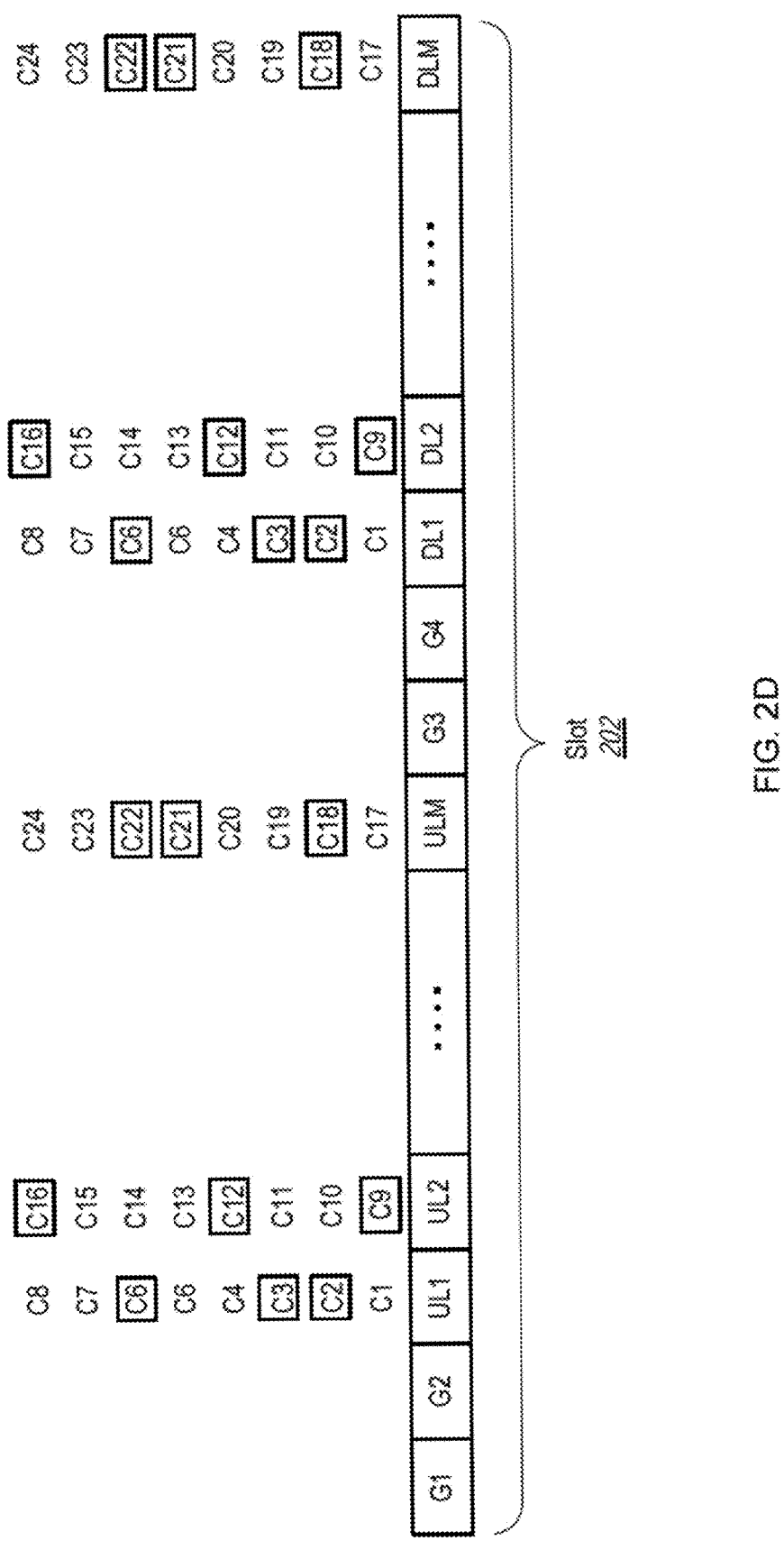
FIG. 2D shows an example of MIMO group selection for sub-slots within a communication time slot.

FIG. 2D shows a slot 202 which includes guard sub-slots, uplink sub-slots, and downlink sub-slots. The slot 202 may be part of a frame such as frames 200 or 250.

For each uplink sub-slot in the example of FIG. 2D, there is a group of client devices that can send packets to a base station. For each downlink sub-slot, there is a group of client devices that can receive packets from the base station. For example, there are a total of eight client devices, C1 through C8, that can send packets to the base station during sub-slot UL1. In some implementations, the number of client devices that are capable of sending packets to the base station during a sub-slot period may be greater than the number of client devices that the base station can communicate with simultaneously. For example, the base station may have three antennas, allowing it to communicate with three client devices at three different frequencies simultaneously. In such situations, the base station must select a number of client devices from the total number of client devices that are capable of communicating during a sub-slot.

Client devices for each sub-slot can be selected so as to ensure that each client device is assigned a number of sub-slots per frame required to satisfy a minimum bandwidth requirement of each client device. For example, a cellular telephone may require four uplink sub-slots per frame in order to meet its minimum bandwidth requirement. Since one static uplink sub-slot per frame is assigned to the cellular telephone, three dynamic uplink sub-slots can be assigned to the cellular telephone in order to satisfy the minimum bandwidth requirement for the cellular telephone.

Still referring to FIG. 2D, a base station can assess eligible client devices for the sub-slot UL1 to determine if any of the eligible client devices require additional uplink sub-slots in order to meet their minimum bandwidth requirements. For example, the base station can identify that the client device C2 requires additional uplink sub-slots in a current frame in order to meet its minimum bandwidth requirements. The base station can then select the client device C2 to transmit packets during the uplink sub-slot UL1.

Once dynamic sub-slots have been assigned to meet the minimum bandwidth requirements of each client device, remaining dynamic sub-slots can be assigned to client devices based on a spectrum efficiency measure (SEM) protocol. In some implementations, the base station can quantify how efficiently each client device can use allotted bandwidth. This assessment can be based on average transmission rate of a client device during a certain time window, average SNR for a client device, average packet loss rate for a client device, average channel capacity, or any appropriate combination of these and other factors.

In some implementations, an SEM rating can be assigned to each client device. For example, client devices can be rated as Best, Good, or Bad. As another example, client devices can be given a numeric rating from 1-10, with 1 being the worst and 10 being the best. As yet another example, client devices can be rated as Best, Good, Medium, Low, or Bad. The SEM rating for a client device can also change over time. For example, a client device moving through a geographic region may move closer to a base station, thereby improving the signal quality of the client device over time. As another example, a source of interference for a client device may decrease over time, thereby improving the signal quality of the client device. As yet another example, a user of a cellular telephone may enter an elevator. The signal quality for the cellular telephone may decrease while the cellular telephone is located in the elevator, and increase once the cellular telephone is no longer in the elevator. In some implementations, a base station will continually reassess the signal quality of each client device in order to assign SEM ratings to the client devices.

Still referring to FIG. 2D, after enough sub-slots have been allocated to ensure that the minimum bandwidth requirement for each client device is met, the remaining dynamic sub-slots can be allocated based on SEM ratings. A base station can identify a set of eligible client devices for each sub-slot. For example, the base station can identify client devices C1-C8 as eligible client devices for transmitting during sub-slot UL1, and client devices C9-C16 as eligible client devices for transmitting during sub-slot UL2. In this example, the base station has three antennas and can therefore select three client devices to communicate during each sub-slot. Client device C2 has been selected in this example to transmit during sub-slot UL1 in order to meet the minimum bandwidth requirements for the client device C2.

The base station can select two more client devices to communicate during sub-slot UL1 based on SEM rating. The base station can first assign an SEM rating to each eligible client device and then select two client devices that have the best SEM ratings out of the eligible client devices. For example, C6 may have a SEM rating of Best and C3 may have an SEM rating of Good with the rest of eligible client devices having SEM ratings of Bad, Low, or Medium. In this example, the base station selects client devices C6 and C3 to communicate during the sub-slot UL1. In some implementations, the base station will select client devices C6 and C3 only if the client devices have not already been assigned enough sub-slots for a current frame to satisfy their maximum bandwidth requirements so as not to assign unneeded bandwidth to the client devices C6 and C3.

As another example, the base station can assign SEM ratings to client devices C9 through C16. The base station can then identify client devices C16, C12, and C9 as having the best SEM ratings, and therefore select the client devices C16, C12, and C9 to communicate during the sub-slot UL2. In some implementations, for every dynamic uplink sub-slot that is assigned to a client device, a corresponding downlink sub-slot can be assigned to the client device. For example, the uplink sub-slot UL1 can be assigned to client device C3, and a corresponding downlink sub-slot DL1 can be assigned to the client device C3. In some implementations, downlink sub-slots are assigned independently of uplink sub-slots. For example, dynamic downlink sub-slots can be assigned so as to meet the minimum bandwidth requirements for all client devices in a communication system, and the remaining dynamic downlink sub-slots can be assigned to client devices based on SEM ratings of the client devices as described above.

In some implementations, a number of dynamic slots within a frame can be designated as required dynamic slots. The sub-slots within required dynamic slots can be assigned to client devices in order to meet the minimum bandwidth requirements for each client device within a communication system. A sufficient number of dynamic slots are identified as required dynamic slots to ensure that the minimum number of sub-slots required by each client device is met. For example, each slot can include 20 uplink sub-slots and 20 downlink sub-slots, and the total number of dynamic uplink sub-slots required to meet the bandwidth requirements of all client devices in a system can be 134. In this example, 7 dynamic slots are designated as required dynamic slots in order to meet the minimum bandwidth requirements of all the client devices in the system.

In some implementations, remaining dynamic slots that have not been identified as required dynamic slots can be designated as SEM dynamic slots. The SEM dynamic slots can be assigned based on SEM ratings of client devices in the system. In such implementations, a base station can first determine an SEM rating for each client device. the base station can then determine which ratings of client devices will be allotted sub-slots within SEM dynamic slots. For example, the base station can determine that Medium, Good, and Best rated client devices will be assigned sub-slots within SEM dynamic slots while Low and Bad rated client devices receive no additional sub-slots. In some implementations, sub-slots within SEM dynamic slots are then allocated proportionally based on SEM ratings. For example, if a total of 7 sub-slots are to be allocated to 5 client devices having Bad, Low, Medium, Good, and Best SEM ratings respectively, 4 sub-slots can be allocated to the Best rated client device, 2 sub-slots can be allocated to the Good rated client device, 2 sub-slot can be allocated to the Medium rated client device, and no sub-slots are allocated to the Low and Bad rated client devices. In some implementations, if allocated sub-slots can not be used by a client device (e.g. because the client device does not have enough traffic), those sub-slots can be reallocated to other client devices.

As noted, SEM dynamic slots can also be designated as Best, Good and Medium slots. For example, if there are a total of 6 SEM dynamic slots in a frame, 3 can be designated as Best slots and the sub-slots within these two slots can be allocated to client devices having SEM ratings of Best; 2 slots can be designated as Good slots and the sub-slots within these three slots can be allocated to client devices having SEM ratings of Good; and 1 slot can be designated as a Medium slot and the sub-slots within this slot can be allocated to client devices having SEM ratings of Medium. In this example, no sub-slots within the SEM dynamic slots are assigned to client devices having Bad or Low SEM ratings unless the maximum bandwidth requirements for all Best, Good, and Medium have been met.

A plurality of methods can be used to assign sub-slots within SEM dynamic slots based on SEM ratings of client devices. For example, let N be the total number of SEM dynamic sub-slots, and let C be the total number of client devices in a communication system. Additionally, let Cb be the number of clients with Best ratings, let Cg be the number of clients with Good ratings, let Cm be the number of clients with Medium ratings, let Cl be the number of clients with Low ratings, and let Cd be the number of clients with Bad ratings. In this example, C=(Cb+Cg+Cm+Cl+Cd). In this example, the number of SEM dynamic sub-slots to assign to each client device having a Best rating can be calculated using the following equation:

$$\text{Sub-slots} = N * \frac{4Cb}{4Cb + 2Cg + Cm} * \frac{1}{Cb}$$

Following this example, the number of SEM dynamic sub-slots to assign to each client device having a Good rating can be calculated using the following equation $$\text{Sub-slots} = N * \frac{2Cg}{4Cb + 2Cg + Cm} * \frac{1}{Cg}$$

Following this example, the number of SEM dynamic sub-slots to assign to each client device having a Medium rating can be calculated using the following equation $$\text{Sub-slots} = N * \frac{Cm}{4Cb + 2Cg + Cm} * \frac{1}{Cm}$$

In this example, the number of SEM dynamic sub-slots assigned to client devices having ratings of Low or Bad is zero.

SEM ratings can be assigned periodically, and the above calculations can be performed periodically. For example, SEM ratings can be reassigned every frame and the calculations can be performed for every frame. In some implementations, if allocated sub-slots cannot be used by a client device (e.g. because the client device does not have enough traffic), those sub-slots can be reallocated to other client devices.

Figure 3A:
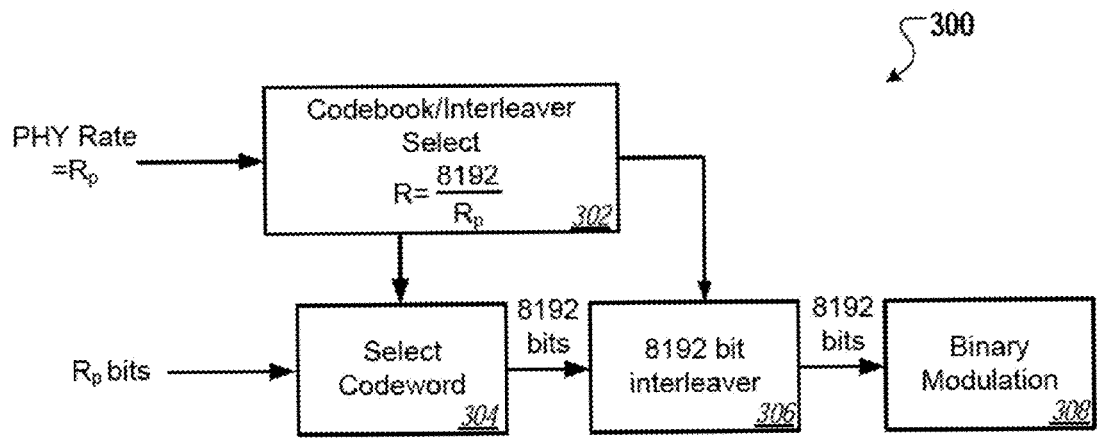
FIGS. 3A and 3B are block diagrams of a binary block encoder with variable rate codebook.
Figure 3B:
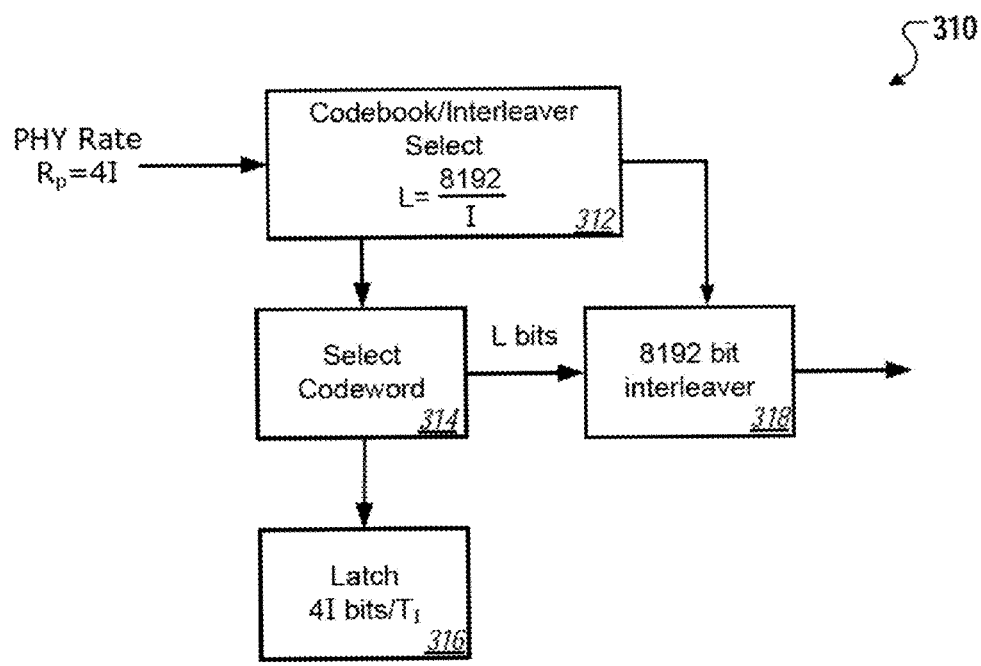

FIGS. 3A and 3B show block diagrams of binary block encoders for encoding blocks of output bits having variable rate codebooks. In general, these encoders can be used to generate frames like those just discussed, by ordering data from multiple sources into combined slots and frames for a communication system. In some implementations, a communication system can support multiple data rates. For example, a communication system may support data rates of 16 bytes per sub-slot, 32 bytes per sub-slot, 64 bytes per sub-slot, 128 bytes per sub-slot, and 256 bytes per sub-slot. As another example, a system can support a data rate of 256 bytes per sub-slot for a total of 2K bits per sub-slot. A binary block encoder can generate 8K bit blocks.

In some implementations, a channel encoding system within a communication system (e.g. the network 100 from FIG. 1) can be represented as a binary block encoder 300 with a variable rate codebook 302. For example, for each desired data rate, an 8192/N rate codebook is used for encoding data in a communication system. One skilled in the art will realize that values other than those describe here within can be used while still providing the same or similar effects. Each block of 8192 output bits is transmitted in a block interleave time $T_I$. Similarly, $R_P$ input bits are consumed in time $T_I$. The desired PHY rate determines a codebook 302 and an associated interleaver 306 used to encode the $R_P$ input bits. Each input and output of data bits occurs every time period $T_I$. The binary block encoder 300 further includes a binary modulation unit 308 for performing spread-spectrum type modulation on the output bits.

Figure 3C:
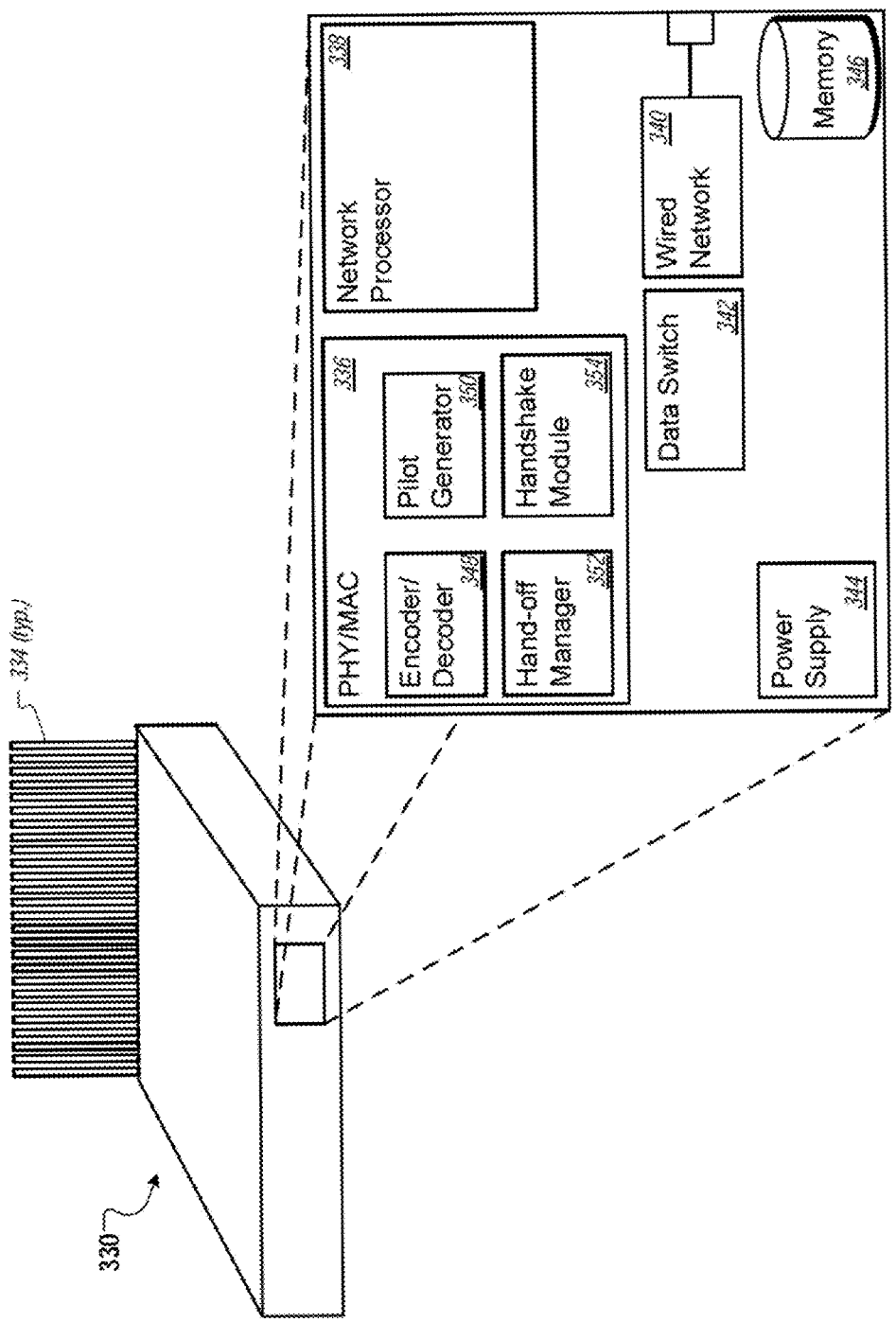
FIG. 3C is a schematic diagram of an example MIMO wireless base station.

FIG. 3B shows an example of how the binary block encoder of FIG. 3A can be re-factored into a block diagram which depicts one particular implementation. Here, each block interleave time $T_I$ is broken up into I smaller time periods $T_a$. In some implementations, for each time period $T_a$, 4 data bits are encoded into L output bits. The output bits are shuffled by an 8192 bit interleaver 318. Since each block of bits output by the interleaver 318 output is transmitted in fixed time interval ($T_I$), then varying the value of L results in different size codebooks and varying values for the time period L. In the example depicted, the data rate is specified as PHY data bits per interleaver block output. FIG. 3C is a schematic diagram of an example MIMO wireless base station 330. The base station 330 communicates with wireless client devices in a communication system (e.g. the network 100 from FIG. 1). In some implementations, the base station 330 communicates with a large number of client devices over a short time period. For example, the base station 330 may communicate with about 10,000 client devices over a period of time that repeats approximately every 70 milliseconds. Client devices that the base station 330 communicates with can include personal computers, laptop computers, cellular telephones, smart phones, personal digital assistants (PDAs), pagers, video game consoles, and other wireless computing devices such as netbooks. Examples of communications that can be transmitted and received by the base station 330 include voice communications, video communications, streaming media, text messages (e.g. SMS messages), picture messages, webpages, web data, e-mails, or computer files.

Many functions for a base station such as base station 330 are well-known, and their description is omitted here for the sake of simplicity and clarity. Particular other components are shown in the base station 330 and are described here to the extent their operation is relevant to the techniques described in this document.

For example, the base station 330 in this example includes multiple antennas 334 to allow the base station 330 to communicate simultaneously with client devices over multiple frequency bands. Each of the antennas 334 transmits and/or receives signals with client devices over a different frequency. In some implementations, the base station 330 can communicate over the range of frequencies between about 50 MHz to about 700 MHz. In some implementations, the base station 330 can communicate over the range of frequencies between about 54 MHz to about 806 MHz. In some implementations, the base station 330 can communicate over the range of frequencies between about 698 MHz to about 806 MHz.

The base station 330 employs a dynamic time division multiple access (TDMA) protocol in order to communicate with multiple wireless client devices via each antenna 334. A TDMA protocol can allow the base station 330 to divide transmission time into distinct time periods and sub-time periods. The base station 330 can designate certain time periods as uplink time periods for receiving data and pilot signals from client devices and designate other time periods as downlink time periods for transmitting signals to client devices, such as in the manners described above. The base station 330 can allocate different sub-time periods to various client devices so that the client devices know when to transmit data and pilot signals to the base station 330. The base station 330 can re-allocate sub-time periods over time based on traffic requirements of client devices and signal strength of communications with client devices.

The base station 330 can also communicate with a single client device using multiple frequencies. For example, a client device may have three antennas, thus allowing the client device to communicate over three different frequency bands simultaneously. In such implementations, the base station 330 can use three of the antennas 334 to communicate with the client device over the three different frequency bands simultaneously or nearly simultaneously. Communicating over multiple frequency bands allows for the bandwidth of communications between the base station 330 and the client device to be increased over situations in which the base station 330 communicates with a client device over a single frequency band.

Still referring to FIG. 3C, in some implementations, the base station 330 includes a PHY/MAC communication module 336 for communicating with client devices over physical data communication protocol layers and Media Access Control (MAC) data communication protocol layers. The PHY/MAC communication module 336 can perform functions that establish communications with client devices, maintain communications with client devices, pass off communications with client devices to other base stations, continue communications with client devices passed off by other base stations, measure signal strength of communications with client devices, and determine the latency of communications with client devices, among other functions. The MAC layer can be controlled so as to defined frames and slots in manners like those discussed above. The individual components of the PHY/MAC communication module 336 are discussed in greater detail below.

In some implementations, the base station 330 includes a network processor 338. For example, the network processor 338 can be an integrated circuit configured to process packet data. The network processor 338 can perform pattern matching in order to identify patterns of bits or bytes within packets in a packet stream. The network processor 338 can also perform data bit field manipulation to change certain data fields contained within a packet as it is being processed. In addition, the network processor 338 can perform queue management functions to properly sequence packets as they are sent and received. In some implementations, the network processor encrypts data transmissions. In some implementations, the network processor 338 processes packet data for higher level packet protocols. For example, the network processor 338 can process IP packet data. Also, in certain implementations, the network processor 338 can be integrated in the PHY/MAC communication module 336, may alternatively or in addition carry out certain of the functionality of the structures shown in the PHY/MAC communications module, and can be implemented in hardware, firmware, software, or a combination of such implementations.

The base station 330 also includes a wired network module 340. The wired network module allows the base station 330 to connect to one or more wired networks in order to send communications received from wireless client devices to another network (e.g., to a wired network of a telecommunications carrier and/or to a network such as the internet), and receive communications that are intended for client devices served by the base station 330. In some implementations, the wired network module 340 can connect to a variety of wired connections. Examples of wired connections include Ethernet cables, T-carrier lines, such as T1 and T3 lines, optic fiber lines, telephone lines, cable lines via a cable modem, and fire wire lines. The wired network module 340 can use a wired network connection to communicate with data routers (e.g. internet routers), data hubs, telephone routers, servers, or other devices within a LAN or WAN (e.g. the world wide web). For example, the wired network module 340 can transmit voice communications received by the base station 330 from a cellular phone to a telephone router. The voice communications can eventually be received by an end user device such as a land line phone, or another cellular phone. As another example, the wired network module 340 can receive webpage data intended for a laptop computer that is in communication with the base station 330 from a web server via one or more routers.

In some implementations, other components of the base station 330 can include a data switch 342 for sending data or packet streams to the correct port or ports of the base station 330; a power supply 344 for providing power to the base station 330 or possibly for connecting to a power source to provide power to the base station 330; and a memory 346 for storing data. In some implementations, the base station 330 can include a variety of other components that have been eliminated in this example for the sake of simplicity and clarity.

The PHY/MAC communication module 336 can include a variety of subcomponents, such as an encoder/decoder 348, a pilot generator 350, a hand-off manager 352 and a handshake module 354. The encoder/decoder 348 maintains communications with client devices in communication with the base station 330. The encoder/decoder 348 can encode bit streams intended for the client devices. For example, the encoder/decoder 348 can convert higher level packets, such as IP packets, into MAC layer packets for transmission to client devices. The encoder/decoder 348 can decode signals received from client devices to extract data packets from the signals. For example, the encoder/decoder 348 can decode data fragments into higher level data packets.

In some implementations, the pilot generator 350 generates pilot signals sent by the base station 330 to client devices. The base station 330 can use a unique spreading sequence for its pilot signal in order to differentiate its pilot signal from pilot signals of other base stations. The base station 330 can send pilot signals during the downlink portion of a time slot as described above with reference to FIG. 2A. In some implementations, a downlink pilot signal is transmitted by the base station immediately preceding a corresponding downlink data signal sub-slot. In some implementations, each pilot signal sent by the base station 330 is a repetition of the same pilot signal.

In some implementations, the handshake module 354 handles association procedures for new client devices. In some implementations, before beginning communications with the base station 330, a client device will initiate an association procedure with the base station 330 in order to request channel access and obtain a transmission schedule. In order to facilitate association with new client devices, the base station 330 can transmit a beacon signal that can be detected by potential client devices. In some implementations, the beacon signal can be the same as, or part of a pilot signal generated by the pilot generator 350. In some implementations, the handshake module 354 will generate a beacon signal that is separate from the pilot signal generated by the pilot generator 350. In some implementations, the beacon signal can be a stream of beacon packets. Each beacon packet can identify a set of codes associated with the base station 330. For example, the set of codes may contain a unique code for each antenna 334 of the base station 330 to allow new client devices to select a particular antenna 334 with which to communicate. Continuing with this example, if the base station 330 has 40 antennas 334, the set of codes will contain 40 unique codes.

In some implementations, a plurality of predefined code sets can be associated with a communication system. For example, a communication system may be associated with eight to sixteen unique code sets, with each code set containing 10 to 40 codes. In such implementations, a base station can be associated with a particular set of codes from the plurality of predefined code sets. In some implementations, neighboring base stations are associated with different code sets to allow client devices to identify different codes for associating with different neighboring base stations. In some implementations, base stations and client devices within a communications system will store the plurality of predefined code sets in memory (e.g. Memory 346) prior to communication between a base station and a client device. The base station can send beacon packets that indicate a set of codes to be used for association without transmitting the entire set of codes. In other implementations, beacon packets sent by a base station can include all or part of a set of codes. In some implementations, if two client devices select the same association code, communications between the client devices and the base station may collide. In some implementations, collisions can be avoided when two client devices select different codes for associating with a base station.

In some implementations, a new client device will attempt to detect beacon packets. The client device will receive one or more beacon packets from the base station 330. The client device can select a code from a set of codes identified by one of the beacon packets. In some implementations, the client device will implement a random back-off process by randomly selecting a number between zero and an initial contention window size. The client device will then wait a time period as specified by the randomly selected number. For example, the randomly selected number can be an integer between zero and the initial contention window size. The client device can wait a number of time slots that is equivalent to the randomly selected number. As another example, the randomly selected number can be 7. In this example, if the time length of a slot is 1.08 milliseconds, the client device can wait for 7.56 milliseconds. Upon time out of the randomly selected back-off time, the client device can send an association request packet using the selected code from the set of codes identified by the beacon packet. In some implementations, the random back-off procedure can reduce the number of collisions between association request packets from multiple client devices. In some implementations, the beacon packet will specify when uplink and downlink portions of slots occur. The client device can use this information to send the association request packet during an uplink portion of a slot. In some implementations, the transmission time of an association packet is about the length of an entire uplink portion of a slot. In some implementations, the association request packet will include an indication of a MAC address of the client device and a cyclic redundancy check (CRC) field.

The base station 330 can receive the association request packet. The handshake module 354 can process the association request packet and generate an association response packet in response to the association request packet. The base station 330 can then send the association response packet to the client device. In some implementations, the base station will send the association response packet during a downlink portion of a slot. In some implementations, the association response packet will be sent during a downlink sub-slot. For example, if each slot includes 30 downlink sub-slots, the base station 330 can send up to 30 association response packets in a single slot. The association response packet can include information that enables the client device to engage in future communications with the base station 330. For example, the association response packet can include an indication of a static slot and static sub-slot during which the client device may transmit data to the base station 330.

In some implementations, the association response packet will include a OFFSET field for specifying an offset value to be used by the client device when determining sub-slots for future communications as described above with reference to FIG. 2D. In some implementations, the association response packet will include a propagation delay for the client device. In some implementations, the base station 330 infers a propagation delay from the association request signal sent by the client device. The client device can use the indicated propagation delay to adjust the timing of future transmissions. In some implementations, the association response packet can include error code bits to indicate error states to the client device. For example, an error code of 00 can indicate no error, and an error code of 01 can indicate that the base station 330 has reached maximum capacity (e.g. the base station 330 is servicing a maximum number of client devices) and is therefore unable to associate with the client device. In this example, an error code of 10 can indicate that the client device is implementing an unsupported protocol. Other implementations, may employ other error codes. In some implementations, the association response packet can include a code for an antenna 334. The client device can use the code to communicate with the associated antenna 334. For example, the client device may transmit an association request packet to the base station 330 using one code, and the base station 330 can indicate in the association response packet that the client device should transmit future communications using a second different code.

In some implementations, the client will wait for a specified time period after sending the association request packet. In some implementations, if the client receives an association response packet from the base station 330 during the specified time period, the client device is associated with the base station 330. In some implementations, if the client device does not receive an association response packet from the base station 330 during the time period, the client device will enter into a random back-off procedure as described above and resend the association request packet. In some implementations, the client device will double the size of the contention window before entering into the second random back-off procedure. In such implementations, the client device can continue to double the contention window size for subsequent random back-off procedures until the contention window reaches a specified maximum contention window size.

For example, the initial contention window size can be 8 slots. If the client device does not receive an association response packet within the specified time period after sending an association request packet, the client device doubles the contention window size to 16, selects a random number between zero and 16, and performs a second random back-off procedure. Upon completion of this second random back-off procedure, the client device will send an association request packet. If an association response packet is not received in response to this second association request packet with the specified time period, the client device will double the contention window size to 32 and repeat the random back-off procedure. This process can continue until the contention window size reaches a maximum contention window size. For example, the maximum contention window size can be 64 slots. As another example, the initial contention window size can be 64 slots and the maximum contention window size can be 256 slots. In some implementations, the process can continue for multiple iterations after the contention window size reaches its maximum value. In some implementations, this process of repeating random back-off procedures and re-transmitting association request packets will stop after a specified number of unsuccessful association attempts. In some implementations, the processes of reiterative back-off procedures described above an allow the base station 330 to associate with a large number of clients over a short period of time. For example, if the set of codes sent by the base station 330 includes 40 unique codes and the maximum contention window size is 256, the base station 330 may be able to associate with up to 5,000 client devices with less than a 10 second association delay for each client.

In some implementations, a client device will receive multiple beacon packets. In some instances, the client device can receive beacon packets from multiple base stations. In such situations, the client device can select a base station to associate with. For example, the client device can elect to associate with a base station having the strongest SNR from among the multiple base stations. In some implementations, the required bandwidth for an association request packet is relatively small compared to the bandwidth required for other communications between the base station 330 and a client device. In some implementations, the client can transmit an association request packet on a reserved code (e.g. frequency band) at a low data rate in order to increase processing gain and therefore increase transmission reliability of the signal. In some implementations, a client device can send an association request packet at lower power than other communications sent by the client device in order to mitigate interferences to other communications between the base station 330 and other client devices that may be transmitting at higher data rates.

In some implementations, the hand-off manager 352 handles the exchange of a client device from one base station to another. For example, the hand-off manager 352 can handle a hand-off for a client device that is moving from an area supported by the base station 330 to an area supported by another base station. In some implementations, hand-off of a client device from the base station 330 to a new base station is initiated by the client device. In some implementations, the client device can send hand-off request packets to both the base station 330 and the new base station. For example, the client device can be moving away from the base station 330 and toward the new base station. The client device can send a hand-off request packet to the base station 330 to indicate that the client device wishes to be handed off to the new base station and send a hand-off request packet to the new base station to indicate that the client device is currently associated with the base station 330 and is seeking to associate with the new base station. The hand-off request packet sent to the base station 330 can be processed by the hand-off manager 352. In some implementations, the client device can send a hand-off request packet to only one or the other of the base station 330 and the new base stations and let the two base stations communicate with each other to complete the hand-off process. In some implementations, hand-off request packets can include information about the client device, such as a MAC address of the client device, as well as identifying information for the base station 330 and the new base station. In some implementations, the client device can associate with the new base station using a process similar to the above described association process.

In some implementations, when a client device is being handed off from another base station to the base station 330, the hand-off manager 352 can generate an update packet for the base station 330 to transmit to neighboring base stations in order to notify the neighboring base stations of a new MAC address for the client device. In some implementations, when a client device is being handed off from the base station 330 to a new base station, the hand-off manager 352 can generate a hand-off message (e.g. a hand-off packet) and transmit the hand-off message to the client device being handed off. The hand-off message can include a field that indicates to the client device how many time slots will transpire before the client device switches to the new base station and what the first static slot for communications between the client device and the new base station will be. The hand-off message can additionally include a field that indicates a sub-slot within the identified first static slot that the client is allowed to transmit data to the new base station. In some implementations, the hand-off message can include a field that indicates a time offset to account for propagation delay between the client device and the new base station. In some implementations, the hand-off message can include error code bits to indicate error states to the client device. For example, an error code 11 can indicate that the time offset field is invalid because the propagation delay was not known at the time that the hand-off message was sent. In some implementations the hand-off message can include some or all of the information that is included in a association response packet as described above.

The client device can send an acknowledgement (ACK) of the hand-off message to the base station 330. The ACK can be received by the base station 330, decoded by the encoder/decoder 348, and processed by the hand-off manager 352. In some implementations, when a client device is being handed off from the base station 330 to a new base station, the hand-off manager 352 can generate a hand-off status message to the new base station to indicate that the client device was successfully contacted and that a hand off of the client device from the base station 330 to the new base station will take place. The new base station can send an ACK for the hand-off status message to the base station 330. In such situations, the base station 330 will free up scheduling resources allocated to the client device being handed off only after receiving the ACK from the new base station. If an ACK is not received from the new base station within a specified time period, the base station 330 can generate and send a new hand-off status message. In some implementations, the base station 330 can send an acknowledgement of the ACK received from the new base station (e.g. a three handshake hand-off).

Figure 4A:
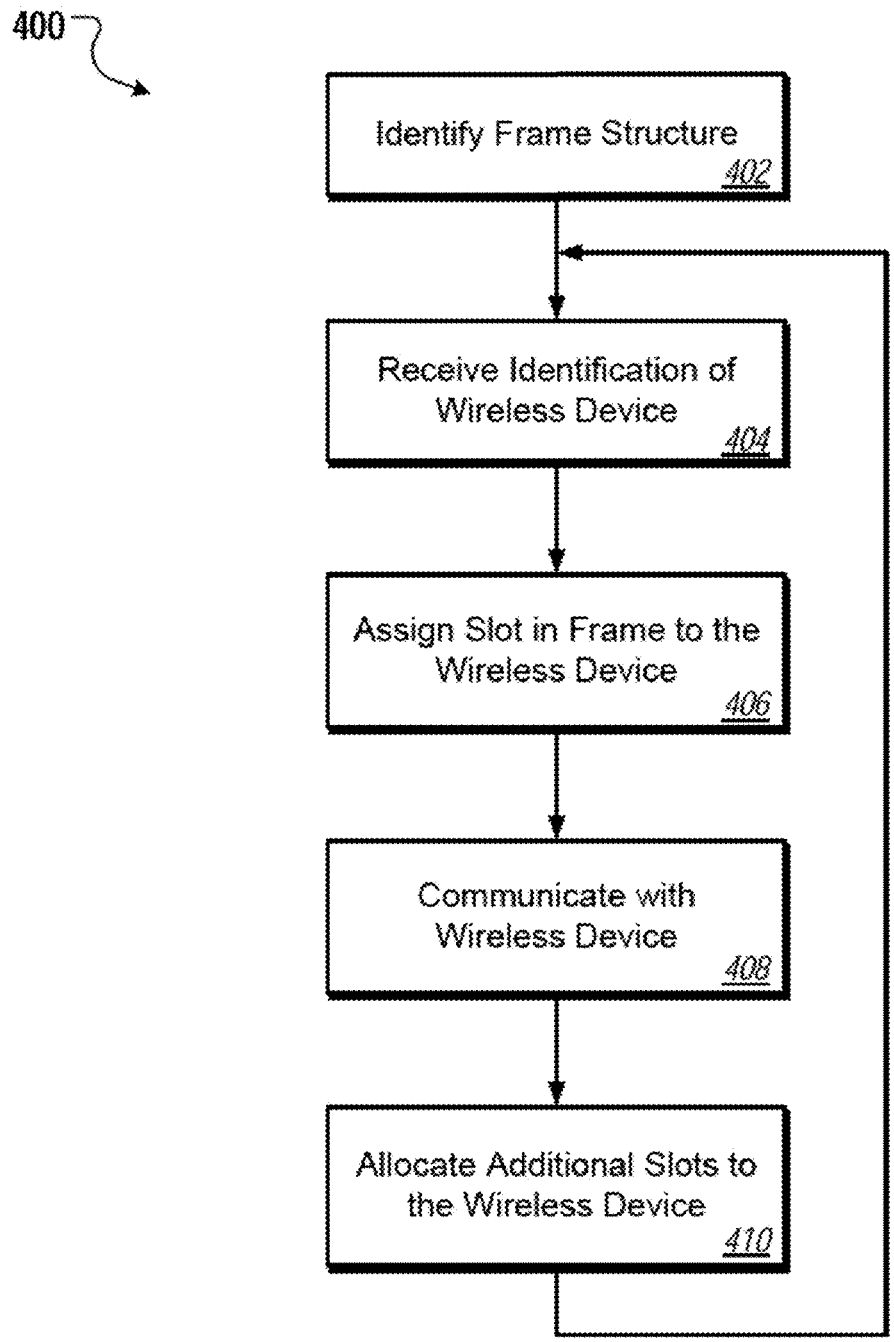
FIG. 4A is a flow chart of a process for allocating slots in a communication frame to a wireless device.

FIG. 4A shows a flow chart of a process 400 for allocating slots in a communication time frame to a wireless device. Step 402 of the process 400 identifies a frame structure. For example, the frame structure can be the communication time frame 200 described above with reference to FIG. 2A. As another example, the frame structure can be the frame 250 described above with reference to FIGS. 2B and 2C. The frame structure can be a repeating series of frames, with each frame having a specified duration (e.g. about 70 milliseconds) that is divided into smaller time portions. For example, each frame can be divided into a number of slots and each slot can be divided into a number of sub-slots. Sub-slots of the frame can serve different purposes. For example, sub-slots can be designated as guard sub-slots, uplink sub-slots, and downlink sub-slots. The frame structure can facilitate communications between a MIMO base station and one or more wireless client devices.

Step 404 receives an identification of a wireless device. For example, referring to FIG. 1, the base station 102 can receive an association request packet from the smart phone 116. As another example, a base station can receive a hand-off request packet from the wireless device. As yet another example, referring to FIG. 1, the base station 104 can receive a hand-off message from the base station 102 identifying the wireless device 112 and indicating that the wireless device 112 is being handed off from the base station 102 to the base station 104. In some implementations, the identification of the wireless device can include a MAC address for the wireless device.

Step 406 assigns a first slot in the frame to the wireless device. For example, a base station can receive an association request from the wireless device and select a slot within the frame to assign to the wireless device. In some implementations, the assigned slot can be a static slot. In such implementations, the static slot can be a slot that is assigned to the wireless device in every frame. In some implementations, the entire slot is not assigned to the wireless device, but rather, one or more specific sub-slots within the slot are assigned to the wireless device. For example, referring to FIG. 2A, sub-slot UL2 can be assigned to the wireless device. In some implementations, the sub-slot UL2 can be assigned to the wireless device as a static sub-slot, thereby indicating that the wireless device is allowed to communicate with the base station during the sub-slot UL2 in every frame.

Step 408 communicates with the wireless device. For example, referring to FIG. 1, the base station 102 can receive an association request packet from the smart phone 116, and in response, send an association response packet to the smart phone 116. The Association response packet can include an indication of a static slot during which the smart phone 116 is allowed to transmit data to the base station 102. In some implementations, the association response packet can include an indication of a static uplink sub-slot within the static slot. For example, the association response packet can include coordinates (7,14) to indicate to the smart phone 116 that the smart phone 116 is allowed to transmit data signals to the base station 102 during the $14^{th}$ uplink sub-slot of the $7^{th}$ slot of every frame.

The smart phone 116 can then transmit data signals during the $14^{th}$ uplink sub-slot of the $7^{th}$ slot of every frame and the base station can receive and process the data signals.

Step 410 allocates additional slots to the wireless device. For example, the wireless device can send a data signal to the base station during the first assigned slot. The data can include an indication of a bandwidth requirement for the wireless device or a request number of slots for the wireless device. In some implementations, the base station can receive a pilot signal from the wireless device during the assigned first slot or sub-slot. in some implementations, the base station can receive a pilot signal from the wireless device during a slot or sub-slot immediately preceding the first assigned slot or sub-slot. The base station can allocate additional slots to the wireless device based on the bandwidth requirement or requested number of slots as described above with reference to FIGS. 2B and 2C. In some implementations, the base station can allocate one or more specific sub-slots within the additional slots to the wireless device. In some implementations, the base station can infer a bandwidth requirement or traffic load for the wireless device through means other than receiving a direct indication of bandwidth requirements or traffic load from the wireless device. For example, the base station may receive an indication of a traffic load from a device with which communications from the wireless device are intended. For example, the wireless device may be a computer accessing a streaming media file from a web server. The web server can indicate to the base station traffic load requirements for the streaming media file. In some implementations, the base station can indicate the additionally allocated slots or sub-slots to the wireless device in a data signal transmitted to the wireless device during a downlink sub-slot.

In some implementations, the process 400 can be performed for multiple wireless devices simultaneously. For example, a base station can associate with numerous wireless devices simultaneously and assign static slots or sub-slots and additional slots (e.g. dynamic slots) or sub-slots to each of the wireless devices. In some implementations, various wireless devices are assigned static sub-slots in different static slots. In some implementations, each of the static slots within a frame is separated from the other static slots by at least one slot that is not a static slot. In some implementations, the number of assigned static slots or static sub-slots is equal to the number of wireless devices in communication with the base station. In some implementations, a non-static slot can be changed to a static slot in order to allow a base station to provide service to additional wireless devices.

Figure 4B:
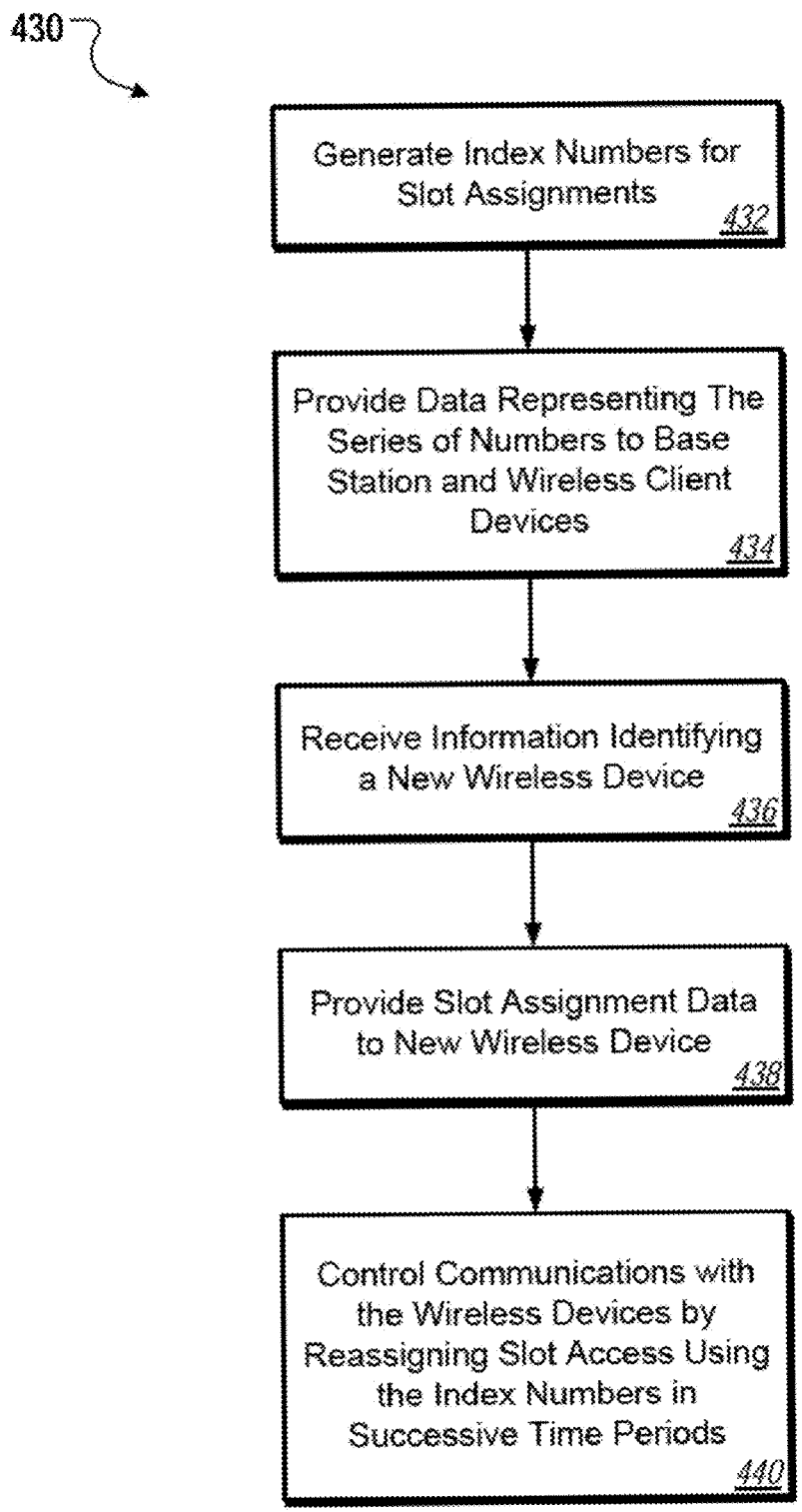
FIG. 4B is a flow chart of a process for enrolling a wireless device with a wireless communication system.

FIG. 4B shows a flow chart of a process 430 for enrolling a wireless device with a wireless communication system. Step 432 generates a series of index numbers for controlling media access slot assignments for a plurality of wireless devices. For example, one or more random number arrays can be generated. In some implementations, the number of random number arrays can be equal to the number of antennas of a base station of a communications system. In such implementations, each random number array can be used to assign slots or sub-slots of a frame for each antenna of the base station. In some implementations, each random number array is made up of a significantly large number of integers. For example, each random number array can have between 10,000 and 1,000,000 integers. In some implementations, each slot is divided into an uplink portion and a downlink portion, with the uplink portion containing a plurality of uplink sub-slots and the downlink portion containing a plurality of downlink sub-slots. The value of the integers stored in the random number array can correspond to a number in the range of 1 to the total number of uplink sub-slots in a slot. For example, referring to FIG. 2A, each slot 202 includes M uplink sub-slots, therefore for a system having the frame structure of the communication time frame 200 the value of each integer in the random number arrays is selected from the range of 1 to M.

Step 434 provides data representing the series of numbers to a base station and one or more wireless devices. In some implementations, the series of numbers is generated by the base station and communicated to the wireless devices. For example, the base station can send data signals indicating the series of numbers to the wireless devices during one or more downlink sub-slots. As another example, the base station can include the series of numbers in association response packets sent to the wireless devices. In some implementations, the series of numbers can be generated by a wireless device and transmitted to the base station. In some implementations, the series of numbers can be preloaded onto a memory or hard drive of the base station and memory or hard drives of each of the wireless devices. This implementation can reduce the amount of unnecessary communication required for association of a wireless device with the base station. In some implementations, the series of numbers is a series of random number arrays. The series of random number arrays can be generated by an entity separate from the base station and the wireless devices and then loaded onto the base station and the wireless devices.

Step 436 receives information identifying a new wireless device. For example, referring to FIG. 1, the base station 102 can receive an association request packet from the computer 110. As another example, a base station can receive a hand-off request packet from the new wireless device. As yet another example, referring to FIG. 1, the base station 104 can receive a hand-off message from the base station 102 identifying the wireless device 112 and indicating that the wireless device 112 is being handed off from the base station 102 to the base station 104. In some implementations, the identification of the wireless device can include a MAC address for the wireless device.

Step 438 provides slot assignment data to the new wireless device. For example, referring to FIG. 1, the base station 102 can receive an association request packet from the computer 110, and in response, send an association response packet to the computer 110. The Association response packet can include an indication of a static slot during which the computer 110 is allowed to transmit data to the base station 102. In some implementations, the association response packet can include an indication of a static uplink sub-slot within the static slot. For example, the association response packet can include coordinates (5,21) to indicate to the computer 110 that the computer 110 is allowed to transmit data signals to the base station 102 during the 21$^{st}$ uplink sub-slot of the 5$^{th}$ slot of the next frame. The computer 110 can then transmit data signals during the 21$^{st}$ uplink sub-slot of the 5$^{th}$ slot of the next frame and the base station can receive and process the data signals.

Step 440 controls communications with the wireless devices by reassigning slot access using the series of index numbers in successive time periods. For example, each client device can perform a calculation to select an integer from a random number array and then use the selected integer as the uplink sub-slot position for an uplink sub-slot in a specified slot in which to communicate in the next frame. In some implementations, the specified slot is a static slot and each wireless device assigned to the static slot will communicate in a different sub-slot within the static slot in each frame based on a calculation performed using the series of index numbers.

For example, the base station and each wireless device will store random number arrays $RN_1$, $RN_2$, $RN_3$, ..., $RN_A$. Let S be the total number of random numbers in each random number array in this example. Each random number in the random number arrays is an integer from the set of integers that spans from 1 to M with M being the number of uplink sub-slots in a slot. In some implementations, a random number can be selected based on information provided by the base station. For example, the base station can indicate a random number array to use in an association response packet. In some implementations, a random number array that corresponds to an antenna or frequency band assigned to a wireless device is selected. For example, if the wireless device is assigned to an antenna having an AntennaID of 7, the random number array $RN_7$ is selected. The base station can provide an offset number OFFSET to the wireless device. In some implementations, the offset number can be transmitted to the wireless device as part of an association response packet. Let F be the number of the frame for which a sub-slot index is being determined. Let $SSL_{static}$ represents a static sub-slot initially assigned to the wireless device. For example, following the example given above for step 438, the value of $SSL_{static}$ is 21 since the initially assigned static sub-slot for the new wireless device is 21. The sub-slot index for the $F^{th}$ frame can be determined by selecting the $k^{th}$ element in the random number array $RN_{AntennaID}$ where k is calculated using the following equation:

$$k=(OFFSET+SSL_{static}+(F-1))\ \%\ S$$

The wireless device can perform this calculation for each frame and then use the $k^{th}$ integer in the random number array $RN_{AntennaID}$ as the uplink sub-slot index in which to transmit data signals to the base station during the wireless device's assigned static slot in the next frame. In some implementations, the offsets are assigned to wireless devices by the base station such that various wireless devices communicating with the wireless device at the same frequency will never calculate the same sub-slot index for the same frame. In some implementations, the calculations for determining a sub-slot during which a wireless device will communicate in a particular frame is calculated by both the wireless device and the base station. Since the wireless device and the base station both store an identical series of index numbers, and the client and base station can both perform the same calculations, both the client and the base station can determine the index of a sub-slot for the wireless device for each frame without additional transmissions for communicating the sub-slot for each frame. In some implementations, the calculations for determining a sub-slot during which a wireless device will communicate in a particular frame is calculated by the base station and transmitted to the wireless device for each frame. For example, the base station can send coordinates indicating a static slot and a sub-slot within the static slot for each frame. In some implementations, slot and sub-slot reassignments can be made every N number of frames (where N is an integer) instead of every frame.

Figure 4C:
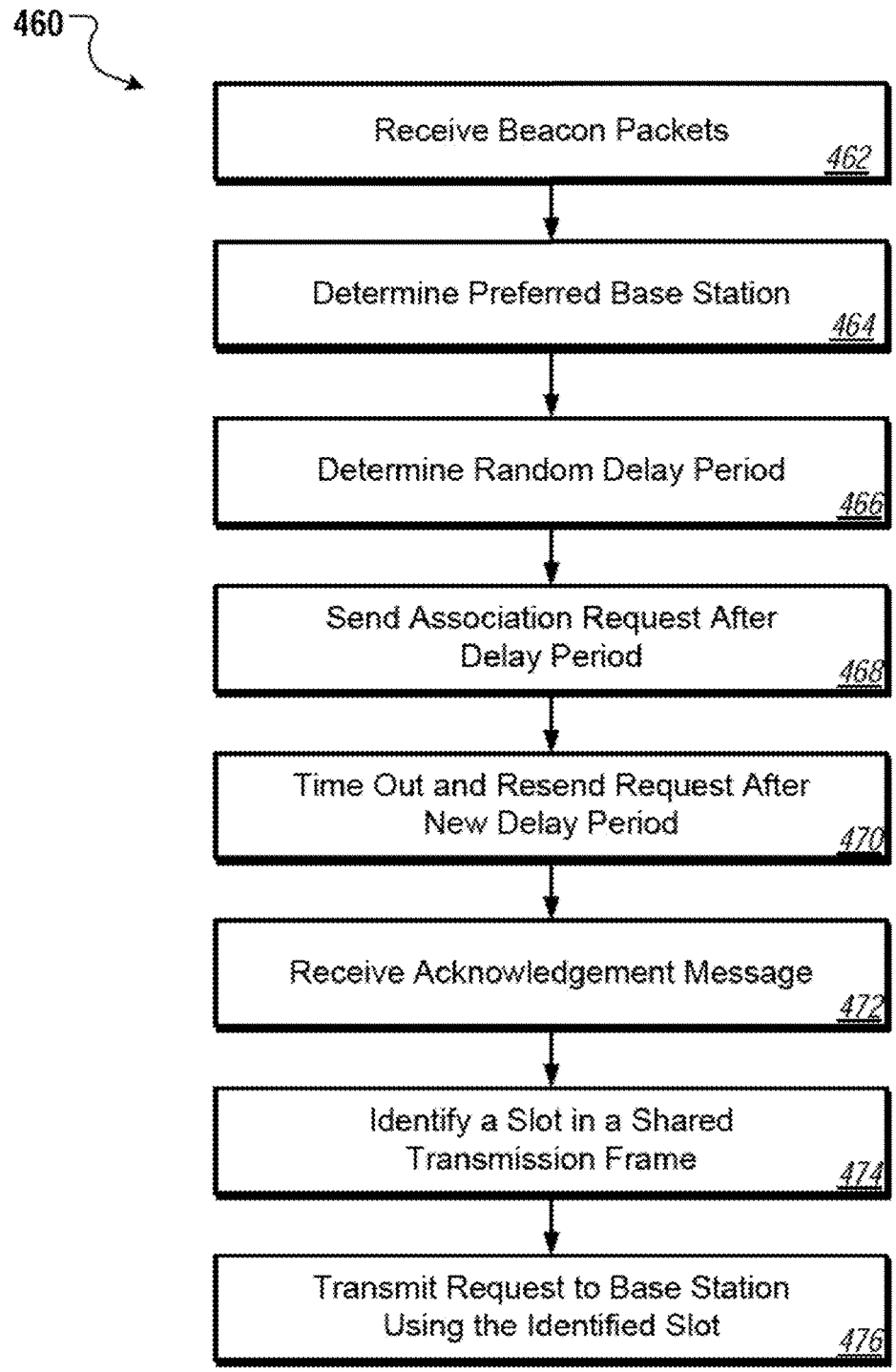
FIG. 4C is a flow chart of a process for establishing a communication link between a mobile wireless device and a base station.

FIG. 4C shows a flow chart of a process 460 for establishing a communication link between a mobile wireless device and a base station. Step 462 receives a beacon packet, for example, a wireless device can receive beacon packets transmitted by one or more base stations. Each beacon packet can identify a set of codes associated with the base station that sent the beacon packet. For example, the set of codes may contain a unique code for identifying each antenna of the base station to allow the wireless device to select a particular antenna with which to communicate.

Step 464 determines a preferred base station. For example a wireless device can receive beacon packets from multiple base stations. In such situations, the wireless device can select a base station to associate with. For example, the wireless device can elect to associate with a base station having the strongest SNR from among the multiple base stations. As another example, beacon packets from various base stations may indicate an amount of available bandwidth and the wireless client can elect to associate with a base station having the most available bandwidth.

Step 466 determines a random delay period. For example, an initial contention window size can be specified for the wireless device (e.g. 64). The wireless device can select an integer between 0 and the initial contention window size. The wireless device will then wait a time period as specified by the randomly selected number. The wireless device can wait a number of slots that is equivalent to the randomly selected number. For example, the randomly selected number can be 7. In this example, if the time length of a slot is 1.08 milliseconds, the wireless device can wait for 7.56 milliseconds.

Step 468 sends an association request after the delay period. For example, upon time out of a randomly selected back-off time, the wireless device can send an association request packet using code selected from a set of codes identified by the beacon packet. In some implementations, the random back-off procedure can reduce the number of collisions between association request packets from multiple wireless devices. In some implementations, the beacon packet will specify when uplink and downlink portions of slots occur. The wireless device can use this information to send the association request packet during an uplink portion of a slot. In some implementations, the transmission time of an association packet is about the length of an entire uplink portion of a slot. In some implementations, the association request packet will include an indication of a MAC address of the wireless device and a cyclic redundancy check (CRC) field. In some implementations, an association request packet can be immediately preceded by a pilot signal of the wireless device.

Step 470 times out and resends the association request after a new delay period. For example, if the wireless device does not receive an association response packet in response to the association request packet during a specified time period, the wireless device will enter into a second random back-off procedure as described above and resend the association request packet. In some implementations, the wireless device will double the size of the contention window before entering into the second random back-off procedure. The wireless device can select an integer between 0 and the new contention window size. The wireless device will then wait a time period as specified by the randomly selected number. The wireless device can wait a number of slots that is equivalent to the randomly selected number. In such implementations, the wireless device can continue to double the contention window size for subsequent random back-off procedures until the contention window reaches a specified maximum contention window size. In some implementations, this process of repeating random back-off procedures and re-transmitting association request packets will stop after a specified number of unsuccessful association attempts.

Step 472 receives an acknowledgement message. For example, a base station can receive the association request packet. The base station can generate an association response packet in response to the association request packet. The base station can then send the association response packet to the wireless device. In some implementations, the base station will send the association response packet during a downlink portion of a slot. In some implementations, the association response packet will be sent during a downlink sub-slot. For example, if each slot includes 64 downlink sub-slots, the base station can send up to 64 association response packets in a single slot. The association response packet can include information that enables the wireless device to engage in future communications with the base station. For example, the association response packet can include an indication of a static slot and static sub-slot during which the wireless device may transmit data to the base station.

In some implementations, the association response packet will specify an offset value to be used by the wireless device when determining sub-slots for future communications as described above with reference to FIG. 4B. In some implementations, the association response packet will include a propagation delay for the wireless device. In some implementations, the association response packet can include error code bits to indicate error states to the wireless device. For example, an error code of 00 can indicate no error, and an error code of 01 can indicate that no resources are available and that the base station is unable to associate with the wireless device. In this example, an error code of 10 can indicate that the wireless device is implementing an unsupported protocol. Other implementations, may employ other error codes. In some implementations, the association response packet can include a code for an antenna of the base station. The wireless device can use the code to communicate with the associated antenna. For example, the wireless device may transmit an association request packet to the base station using one code, and the base station can indicate in the association response packet that the wireless device should transmit future communications using a second different code.

Step 474 identifies a slot in a shard transmission frame. For example, the received acknowledgement message can indicate a static slot and sub-slot during which a wireless device is allowed to transmit data signals to a base station during a frame. The static slot and sub-slot can be indicated as a set of coordinates. For example, the coordinates (13, 27) indicate that a static uplink sub-slot assigned to the wireless device is the $27^{th}$ uplink sub-slot in the $13^{th}$ slot of the next frame. In some implementations, a static slot is assigned and a static sub-slot is determined using a procedure such as that described above with respect to FIG. 4B.

Step 476 transmits a request to a base station using the identified slot. For example, a wireless device can transmit a data signal to the base station. The data signal can include communication data (e.g. higher level packet data) as well as a request for additional transmission time. The base station can allocate additional transmission time for upcoming frames (e.g. dynamic sub-slots) to the wireless device in response to the request. In some implementations, a request can include traffic information for the wireless device, such as maximum and minimum bandwidth requirements and delay constraints. In such implementations, the base station can allocate a suitable number of sub-slots on the traffic load and channel conditions for the wireless device. In some implementations, a wireless device can specify a specific number of requested uplink sub-slots for a frame in a dynamic sub-slot request. The base station can then grant a number of sub-slots to the wireless device based on the number of sub-slots requested by the wireless device and other wireless devices also communicating with the base station.

In some implementations, a base station can send a grant message to a wireless device to indicate additional transmission time assigned to the wireless device for a particular frame. In some implementations, the grant message includes a bit mask to indicate dynamic slots within a frame that are assigned to the wireless device. For example, the base station can send a 16 bit mask to indicate slot assignments for the next 16 slots. In this example, a bit mask of 0001 010 1010 0001 can indicate that a wireless device receiving the bit mask can transmit during the $4^{th}$, $6^{th}$, $9^{th}$, $11^{th}$, and $16^{th}$ slots after the slot in which the wireless device received the schedule. In some implementations, the specific sub-slot for each identified dynamic slot can be determined as described above with reference to FIG. 4B. In some implementations, a wireless device will transmit during a pre-specified sub-slot for each indicated slot, where the pre-specified sub-slot is the same from frame to frame. In some implementations, a grant message can indicate assigned uplink sub-slots by providing a slot index and a sub-slot index for each assigned sub-slot.

Figure 5:
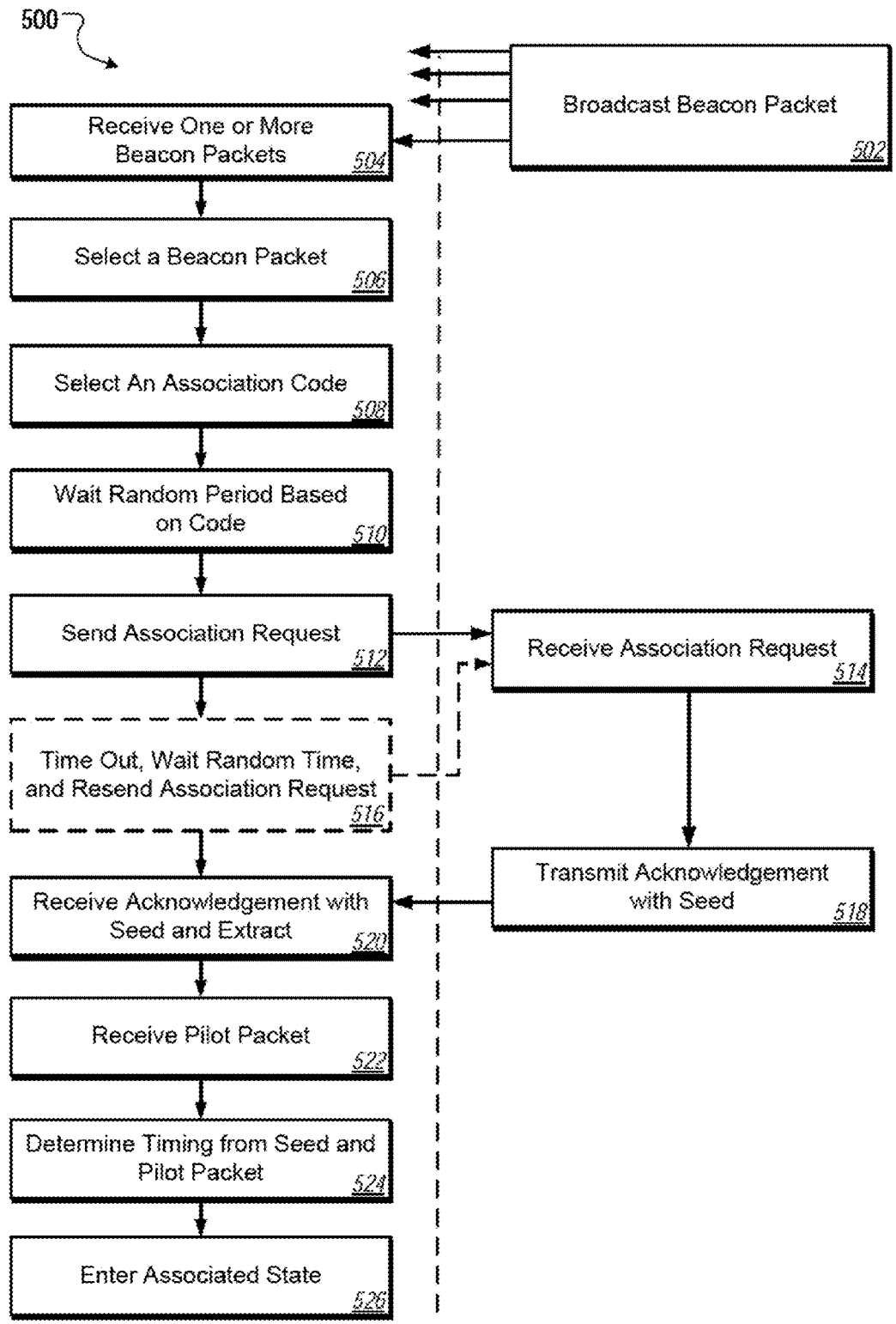
FIG. 5 is a swim lane diagram of a process for associating a mobile wireless device with a base station.

FIG. 5 is a swim lane diagram of a process 500 for associating a mobile wireless device with a base station. At step 502, broadcasts one or more beacon packets. For example, referring to FIG. 1, the base station 102 can broadcast beacon packets. Each beacon packet can identify a set of codes associated with the base station that sent the beacon packet. For example, the set of codes may contain a unique code for identifying each antenna of the base station to allow the wireless device to select a particular antenna with which to communicate.

At step 504, receives one or more beacon packets. For example, referring to FIG. 1, the phone 114 can receive beacon packets broadcast by the base station 102. In some implementations, a wireless device can receive beacon packets from multiple base stations. For example, the wireless device 112 can receive beacon packets broadcast by the base station 102 and the base station 104.

Step 506 selects a beacon packet. For example, in an implementation in which a wireless device receives beacon packets from multiple base stations, the wireless device can select a base station to associate with. For example, the wireless device can elect to associate with a base station having the strongest SNR from among the multiple base stations. As another example, beacon packets from various base stations may indicate an amount of available bandwidth and the wireless client can elect to associate with a base station having the most available bandwidth.

Step 508 selects an association code. For example, the selected beacon packet can include a set of codes which contains a unique code for identifying each antenna of a base station associated with the selected beacon packet. In some implementations, a wireless device can randomly select one of the codes. In other implementations, the wireless device can use information associated with the codes to select a code. For example, each code may be associated with an indication of the number of wireless devices currently communicating with the base station using that code.

Step 510 waits a random period based on the code. For example, each code can be associated with an initial contention window size. The wireless device can select an integer between 0 and the initial contention window size for the selected code. The wireless device will then wait a time period as specified by the randomly selected number. In some implementations, the wireless device waits a number of slots that is equivalent to the randomly selected number. For example, the randomly selected number can be 42. In this example, if the time length of a slot is 2 milliseconds, the wireless device can wait for 84 milliseconds.

Step 512 sends an association request. For example, upon time out of a randomly selected back-off time, a wireless device can send an association request packet using the selected code. In some implementations, the association request packet will include an indication of a MAC address of the wireless device and a cyclic redundancy check (CRC) field. In some implementations, an association request packet can be immediately preceded by a pilot signal of the wireless device.

Step 514 receives the association request. For example, a base station can receive the association request. The base station can generate an association response upon receiving the association request. The base station can then send the association response to the wireless device. In some implementations, the base station will send the association response during a downlink portion of a slot. In some implementations, the association response packet will be sent during a downlink sub-slot. The association response can include information that enables the wireless device to engage in future communications with the base station. For example, the association response can include an indication of a static slot and static sub-slot during which the wireless device may transmit data to the base station. In some implementations, the association response packet will include a propagation delay for the wireless device. In some implementations, the association response packet can include error code bits to indicate error states to the wireless device.

Optional step 516 times out, waits a random time, and resends the association request. For example, if a wireless device does not receive an association response within a specified time period after sending the first association request, the wireless device will enter into a second random back-off procedure as described above and resend the association request packet. In some implementations, the wireless device will double the size of the contention window before entering into the second random back-off procedure. In some implementations, this process of repeating random back-off procedures and re-transmitting association request packets will stop after a specified number of unsuccessful association attempts. In some implementations, step 516 is not performed if a response to the association request is received within the specified time period.

Step 518 transmits an acknowledgement that includes a seed. For example, a response sent by a base station can include one or more seeds that can be used to generate one or more random number arrays. The random number arrays can be as described above with reference to FIG. 4B. In some implementations, the seed can be an offset value to be used by the wireless device when determining sub-slots for future communications as described above with reference to FIG. 4B. In some implementations, the seed can be an indication of a random number array to be used when determining sub-slots for future communications as described above with reference to FIG. 4B. In some implementations, the seed can be an indication a transmission time during which the wireless device can transmit data to the base station. For example, the seed can be an indication of a static uplink sub-slot within in a static slot in which the wireless device can transmit data to the base station in the next frame.

Step 520 receives the acknowledgement with the seed and extracts the seed. For example, the wireless device can receive the acknowledgement and extract an offset value from the acknowledgement. As another example, the wireless device can extract one or more seeds to be used to generate one or more random number arrays from the acknowledgement. As yet another example, the wireless device can extract static slot and sub-slot information from the acknowledgement.

Step 522 receives a pilot packet. For example, the wireless device can receive a pilot signal from the base station. The wireless device can use the pilot signal to determine a propagation delay for signals sent between the base station and the wireless device. This propagation delay can be used to alter the transmission times of future communications from the wireless device to the base station. In other implementations, rather than determining a propagation delay for signals sent between the base station and the wireless device based on a pilot signal received from the base station, the wireless device can receive an indication from the base station of a propagation delay. For example, the base station can use a pilot signal transmitted by the wireless device to calculate a propagation delay for communications sent between the base station and the wireless device. The base station can then indicate the propagation delay to the wireless device. For example, the base station can transmit a signal during a downlink sub-slot that indicates a propagation delay for signals sent between the base station and the wireless device.

Step 524 determines timing from the seed and pilot packet. For example, in an implementation in which the seed indicates a static uplink sub-slot in which to transmit communications, the wireless device can use propagation delay information derived from the pilot signal, or received from the base station, to correct the timing of the indicated static uplink sub-slot and transmit data during this corrected static uplink sub-slot. In such implementations, the timing is corrected to account for propagation delay so that the data transmission reaches the base station during the sub-slot that the base station is expecting the data. In some implementations, information derived from the seed can be used to calculate a slot or sub-slot during which the wireless device is allowed to transmit data signals to the base station. The calculated slot or sub-slot can then be adjusted for propagation delay as described above.

Step 526 enters an associated state. For example, the wireless device will transmit data during the determined slot and uplink sub-slot in the next frame. The wireless device will then continue to transmit data signals to the base station during newly calculated sub-slots of the determined slot in subsequent frames as described above with reference to FIG. 4B. While in the associated state, the wireless device can request additional bandwidth (e.g. dynamic sub-slots) and the base station can grant some or all of the requested additional bandwidth to the wireless device.

Figure 6:
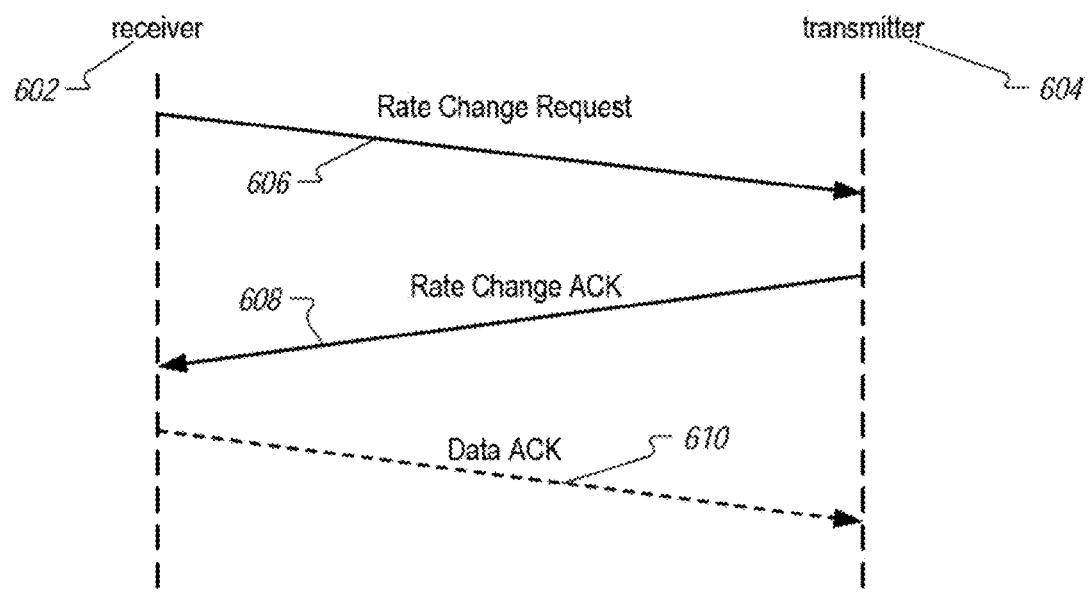
FIG. 6 is a diagram showing rate change signals passed between a transmitter and a receiver.

FIG. 6A is a diagram showing rate change signals passed between a transmitter 604 and a receiver 602. In some implementations, the receiver 602 is a client device and the transmitter 604 is a base station. In other implementations, the receiver 602 is a base station and the transmitter 604 is a client device. In some implementations, the receiver 602 will initiate a data transmission rate change by sending a rate change request 606 to the transmitter 604. The rate change request 606 specifies a new data rate that is being requested by the receiver 602. In some implementations, if the receiver 602 is a client device, the rate change request is sent during an uplink sub-slot assigned to the client device.

The transmitter 604 can respond to the rate change request 606 with a rate change acknowledgment (ACK) 608. The rate change ACK 608 can include an indication of a slot at which the new rate will start being used. In some implementations, the rate change ACK 608 will indicate the slot index within a frame of the slot at which the new rate will start being used. In some implementations, the rate change ACK 608 will indicate a number of slots that will transpire after the current slot before the new rate will be used. For example, an indication of 3 can indicate that communications will change to the new data rate in 3 slots after the current slot. In some implementations, the rate change ACK 608 can indicate a sub-slot in which the communications will change to the new data rate. Upon reception of the rate change ACK 608, the receiver 602 can change the expected data rate for the specified slot or sub-slot. In some implementations, if the rate change ACK 608 is not received by the receiver 602, then no rate change will occur. In some implementations, the receiver 602 will send a data ACK 610 in response to the rate change ACK 608 to notify the transmitter 604 that the receiver 602 successfully received the rate change acknowledgement. In some implementations, the data rate change will not occur until after the transmitter 604 has received a data ACK 610 from the receiver. In such implementations, the slot at which the rate change will take place, as specified by the rate change ACK 608, should be a sufficient number of slots after the slot in which the rate change ACK 608 is transmitted to allow for a data ACK 610 to be received by the transmitter 604 before the data rate change takes place.

In some implementations, if either the rate change request 606 or the rate change ACK 608 is not received by the intended recipient (e.g. the signal is lost), then neither the transmitter 604 nor the receiver 602 will change data rates. In such instances, both devices will keep the previous data rate. In some implementations, if the data ACK 610 is not received by the transmitter 604, the receiver 602 will switch to the new data rate at the specified slot or sub-slot and the transmitter 604 will not switch to the new data rate. In such implementations, the transmitter 604 and the receiver 602 may not be able to communicate. In some implementations, the transmitter 604 and the receiver 602 will disassociate if one device changes to the new data rate and the other does not. In some implementations, if one device changes to the new data rate and the other does not, if the devices detect that they are no longer able to communicate, both devices will return to communicating at the previous data rate.

In some implementations, the transmitter 604 will initiate a data transmission rate change by unilaterally decreasing the transmission rate of a data transmission to the receiver 602. For example, the transmitter 604 can decrease the data transmission rate by a power of two. In such implementations, the receiver 602 will decode the current data rate and all basic data rates below the current data rate, where a basic data rate is defined as data rate that when multiplied by a multiple of 2 will equal the current data rate. Therefore, the receiver 602 can decode the transmission from the transmitter 604 at the new lower data rate and determine that the data transmission rate has been changed. The new lower rate will then become the transmission rate for communications. In such implementations, the data rate can only be changed to a lower data rate, and not a higher data rate.

Figure 7A:
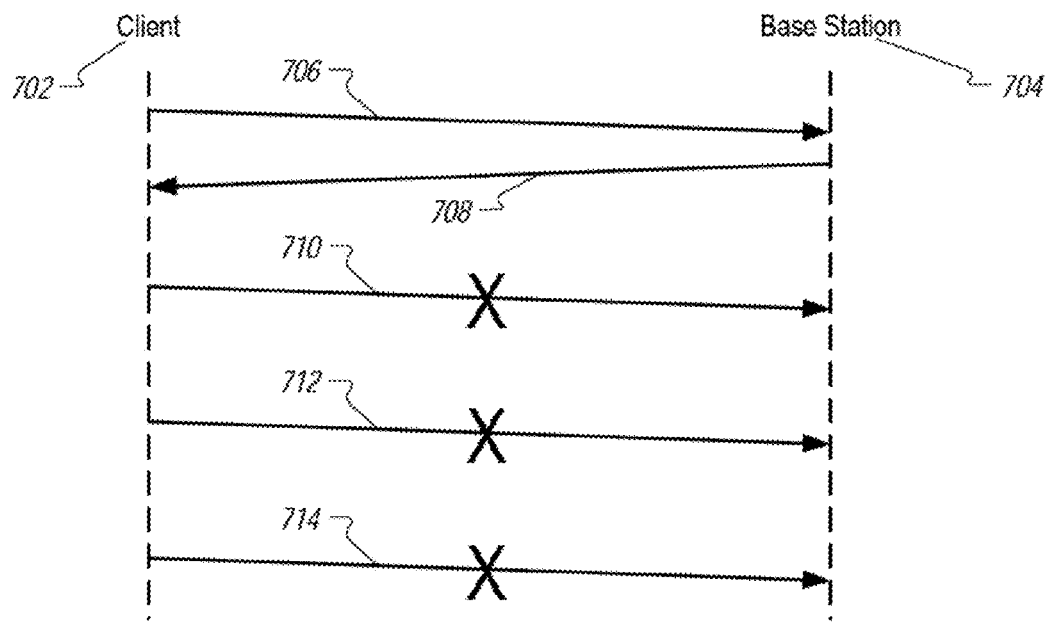
FIG. 7A is a diagram showing signals exchanged between a wireless client and a base station leading to a disassociation.
Figure 7B:
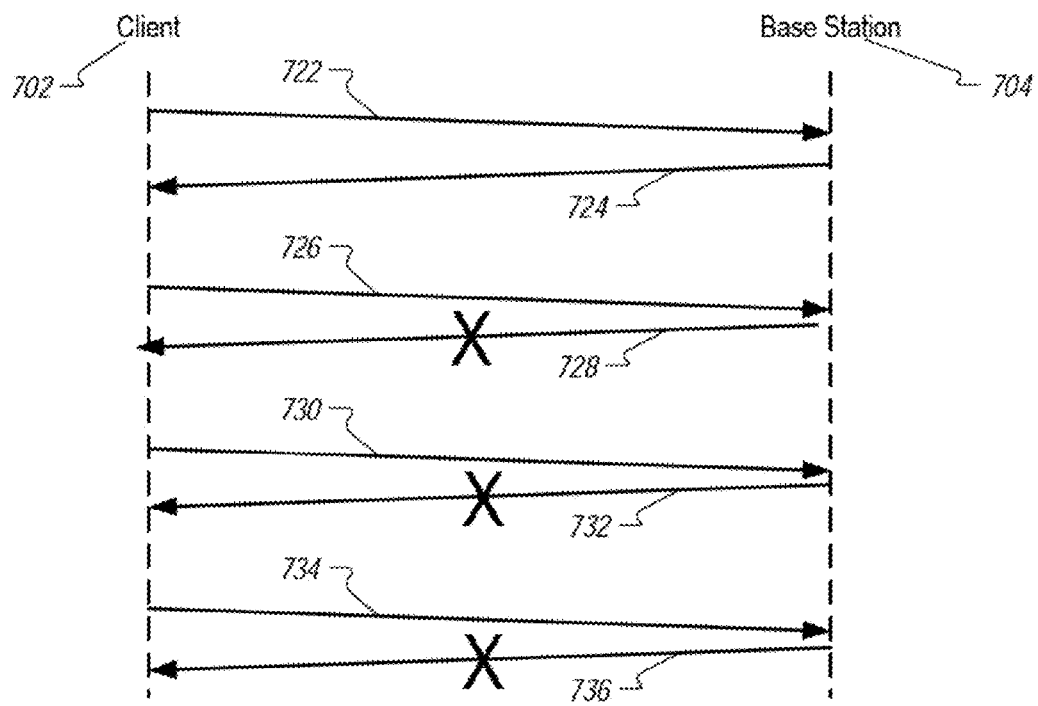
FIG. 7B is a diagram showing signals exchanged between a wireless client and a base station leading to a disassociation.

FIG. 7A shows an example of signals sent between a client 702 and a base station 704 leading to a disassociation between the client 702 and the base station 704. For example, a client device may lose power, break down, lose signal, or travel out of service range of a base station. The base station can detect that the client device is no longer available and disassociate with the client device, thus freeing up slots or sub-slots assigned to the client device for use by other client devices. For example, if the base station 704 does not receive a transmission from the client 702 for a specified number of consecutive static-slots assigned to the client 702, the base station 704 will disassociate with the client 702 and allocate sub-slots assigned to the client 704 to other client devices. In some implementations, each client device served by the base station 704 is assigned exactly one static uplink sub-slot per frame. As another example, the disassociation period can be 3 frames. If the base station 704 does not receive a transmission from the client 702 during the static sub-slot assigned to the client 702 in three consecutive frames, the base station will disassociate with the client 702.

As yet another example, the client 702 sends a data signal 706 to the base station 704 during a static sub-slot assigned to the client 702. The base station 704 sends a signal 708 in response to the data signal 706. The base station will then expect to receive a signal 710 from the client 702 during an assigned static sub-slot in the next frame. In some implementations, the signal 710 does not reach the base station 704 because the client 702 is out of range for the base station 704 or due to interference. In some implementations, the signal 710 does not reach the base station 704 because the client 702 is turned off, or otherwise disabled, and therefore the client 702 does not send the signal 710. In this example, if the base station 704 does not receive the signal 710, the base station will not send a subsequent transmission to the client 702.

Still following this example, the base station will expect to receive a signal 712 during an assigned sub-slot of the next frame. If the base station 704 does not receive the signal 712, the base station will not send a subsequent transmission to the client 702. In the following frame, the base station will expect to receive the signal 714. If the base station 704 does not receive the signal 714, the base station will recognize that a signal has not been received from the client 702 for three consecutive frames. The base station 704 will then disassociate with the client 702 and allocate sub-slots assigned to the client 702 to other client devices associated with the base station 704.

FIG. 7A shows another example of signals sent between the client 702 and the base station 704 that will lead to a disassociation of the client 702 and the base station 704. In this example, the client 702 sends a signal 722 to the base station 704. In some implementations, the signal 722 is sent during a static uplink sub-slot assigned to the client 702. The base station sends a signal 724 to the client 702 in response to the signal 722. The client 702 then sends a signal 726 to the base station 704 during the next frame. The client device 702 will expect to receive a signal 728 in response to the signal 726 during the next frame. In some implementations, the signal 728 does not reach the client 702 because the client 702 is out of range for the base station 704 or due to interference with the signal 728. In some implementations, the base station 704 does not send the signal 728 because the base station did not receive the signal 726. In some implementations, the signal 728 does not reach the base client 702 because the base station 704 is turned off, or otherwise disabled, and therefore the base station 702 does not send the signal 728.

Still following this example, the client 702 transmits a signal 730 to the base station 704 in a subsequent frame. In some implementations, the signal 730 can retransmit data sent in the signal 726 since the client 702 did not receive an acknowledgement of the signal 726. In some implementations, the signal 730 can include data that is distinct from data included in the signal 726. The client will expect to receive a signal 732 in response to the signal 730 within the current frame. In this example, the client 702 does not receive the signal 732. The client 702 then transmits a signal 734 to the base station 704 in a subsequent frame. In some implementations, the signal 734 can retransmit data sent in the signals 726 or 730 since the client 702 did not receive an acknowledgement of the signals 726 or 730. In some implementations, the signal 734 can include data that is distinct from data included in the signals 726 or 730. The client will expect to receive a signal 736 in response to the signal 734. In some implementations, if the client 702 does not receive the signal 736 within a specified time period, the client 702 will disassociate with the base station 704.

In some implementations, following disassociation, the client 702 will attempt to initiate an association procedure with the base station 704 or another base station as described above with reference to FIG. 4C. In some implementations, the base station may have received some or all of the signals 728, 732, and 736. In such implementations, the base station 704 may wait one or more additional frames in which a signal is not received from the client 702 before disassociating the client 702 and allocating slots or sub-slots assigned to the client 702 to other devices.

Figure 8:
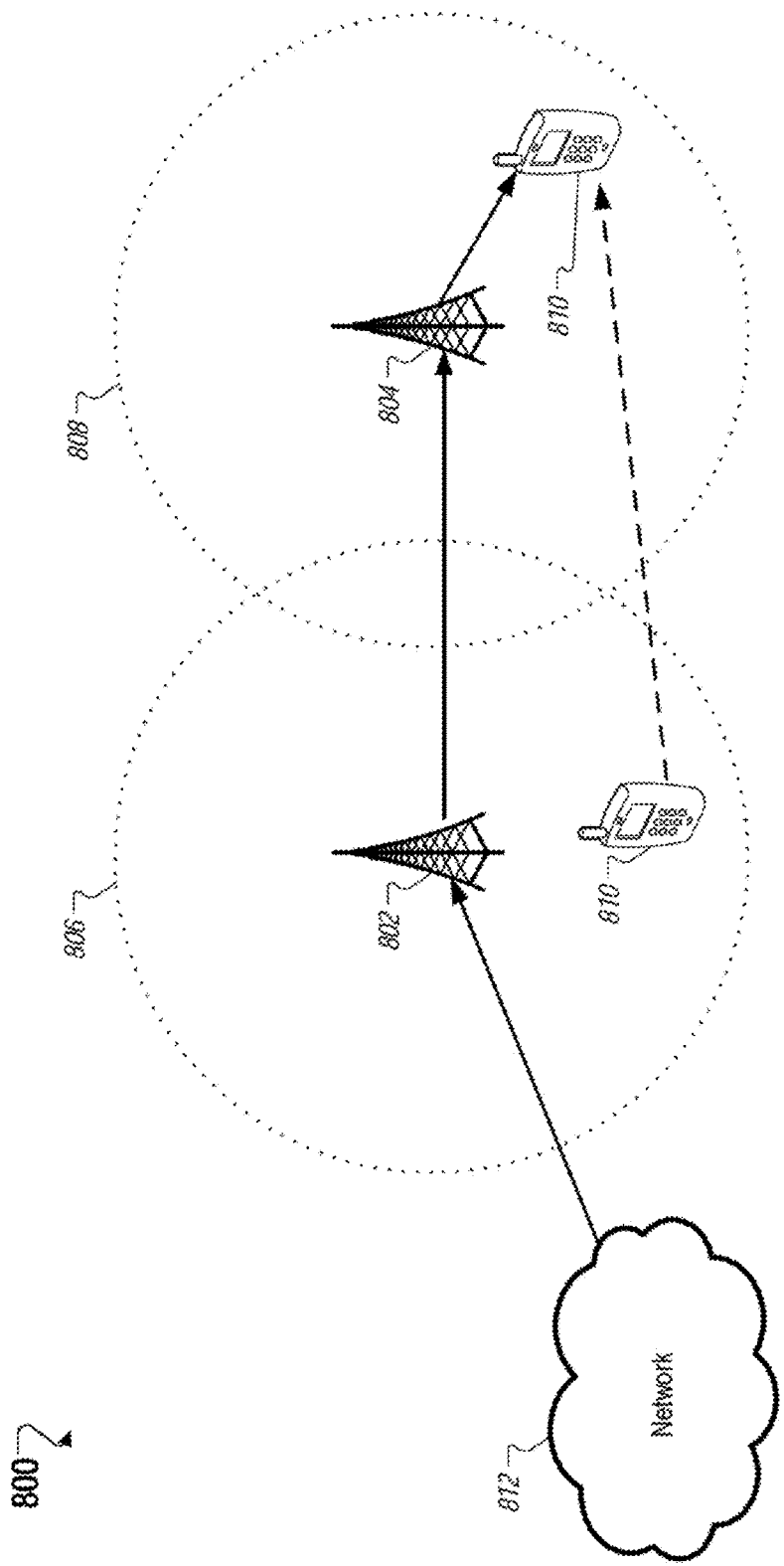
FIG. 8 shows a network of base stations and a wireless client in a communications system.

FIG. 8 shows communications system 800 in which communications are transmitted between base stations and client devices. The communications system 800 includes a base station 802 having a service range 806 and a base station 804 having a service range 808. The service ranges 806 and 808 represent geographic areas in which wireless client devices can exchange communications signals with the base stations 802 and 804 respectively The communication system 800 additionally includes a wireless device 810 that is initially associated with the base station 802. In some implementations, while associated with the base station 802, the wireless device 810 transmits wireless data packets to the base station 802. The base station 802 can process the wireless data packets received from the wireless device 810 and assemble higher level packets (e.g. IP packets) from the wireless data packets.

In base station 802 can then transmit the IP packets to an intended recipient. For example, the base station 802 can have a hard wired connection to a network 812 (e.g. the Internet). The intended recipient of the IP packets can be a web server, a personal computer, or another wireless device, for example.

In some implementations, the base station 802 can be associated with a particular IP address space. For example, base station 802 may be associated with IP addresses in the range of 208.77.0.0 to 208.77.7.231. In some implementations, the base station 802 will assign IP addresses from its IP address space to client devices in communication with the base station 802. In some implementations, the base station 802 receives communications from the intended recipient in the form of IP packets via the network 812. The IP packets can indicate that they are intended for the wireless device 810 by indicating an IP address assigned to the device 810 by the base station 802. The base station 802 can form wireless data packets which include portions of the IP packets and transmit the wireless data packets to the wireless device 810 while the wireless device 810 is located within the service range 806. In some implementations, the wireless device 810 leaves the service range 806 and enters the service range 808. In such implementations, the wireless device 810 can send a hand-off request to the base station 804. A hand-off procedure, such as that described above with reference to FIG. 3C, can then be initiated.

After the wireless device 810 has been handed off to the base station 804, the base station 802 may continue to receive IP packets from the network 812 that are addressed to the IP address assigned to the wireless device 810 by the base station 802. The base station 802 can forward these packets to the base station 804. The base station 804 can then form wireless data packets from the IP packets and transmit the wireless data packets to the wireless device 810. In some implementations, after a period of time, the base station 804 may begin to receive IP packets intended for the wireless device 810 directly from the network 812 without the IP packets being routed through the base station 802. For example, the base station 804 may also be connected to the network 812. The base station 804 can begin sending IP packets from the wireless device 810 to the intended recipient via the network 812. One or more routers within the network 812 can recognize that IP packets associated with the wireless device 810 are now being transmitted through the network 812 via the base station 804 rather than the base station 802. These one or more routers can then being directing IP packets intended for the wireless device 810 directly to the base station 804, leaving the base station 802 out of the communication process.

In some implementations, the wireless device 810 will keep the IP address assigned to it by the base station 802 after it has moved from the service range 806 to the service range 808. In such situations, IP packets intended for the wireless device 810 will continue to be addressed to the assigned IP address of the wireless device 810. In such situations, the base station 802 will keep in subsequent contact with the base station 804 or other base stations to which the wireless device 810 is handed-off until the wireless device 810 disassociates with a base station. This will allow the base station 802 to reclaim the assigned IP address, and assign the IP address to another client device once the wireless device 810 is no longer using the assigned IP address.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for establishing electronic communications, comprising:

receiving at a first wireless device one or more beacon packets sent by a communication base station;

determining a delay period at the first wireless device, wherein the delay period is determined so that a delay for the first wireless device is different than a delay for a second wireless device;

sending a first association request from the first wireless device after waiting for the delay period, wherein the first association request includes information identifying the first wireless device and an association code;

receiving an association response from the communication base station within a determined time period, wherein the association response includes an identifier for a static slot of a repeating frame structure and an identifier for a static uplink sub-slot within the static slot, the static uplink sub-slot being designated for transmissions from the first wireless device to the communication base station; and in response to receiving an association response from the communication base station within the determined time period, establishing communication with the communication base station.

2. The method of claim 1, wherein the one or more beacon packets identify the association code for the communication base station.

3. The method of claim 2, wherein the association code includes a code that identifies an antenna on the communication base station for communicating with the communication base station.

4. The method of claim 1, further comprising receiving, at the first wireless device, beacon packets from a plurality of different base stations, wherein the beacon packets sent by each base station include one or more association codes that are distinct from association codes received from the other base stations, and selecting one of the association codes in preference to the other association codes.

5. The method of claim 4, wherein selecting the one of the association codes in preference to the other association codes comprises selecting the association code from a base station having a highest signal strength at the first wireless device.

6. The method of claim 4, wherein selecting the one of the association codes in preference to the other association codes comprises selecting the association code from a base station having a highest level of available resources.

7. The method of claim 4, wherein selecting the one of the association codes in preference to the other association codes comprises selecting the one of the association codes randomly.

8. The method of claim 1, wherein the static uplink sub-slot is designated for transmissions from the first wireless device to the communication base station in each of multiple consecutive repetitions of the repeating frame structure.

9. The method of claim 1, further comprising using data stored on the first wireless device to identify a position for the static uplink sub-slot in the repeating frame structure.

10. The method of claim 1, further comprising:

identifying the repeating frame structure for communication between the first wireless device and the communication base station, the repeating frame structure including a plurality of slots, with each slot including an uplink portion and a downlink portion, and each uplink portion and downlink portion comprising a plurality of sub-slots;

obtaining by the first wireless device a sub-slot in an uplink portion of a static slot in the frame structure, to the exclusion of other wireless computing devices, wherein the sub-slot is associated with the first wireless device throughout a communication session, and each sub-slot in the uplink portion that is assigned to a wireless device is assigned to a wireless device distinct from wireless devices to which each of the other sub-slots in the uplink portion are assigned.

11. The method of claim 1, wherein receiving at the first wireless device one or more beacon packets sent by the communication base station comprises receiving, at the wireless device, the beacon packets from the communication base station and beacon packets for a plurality of neighboring base stations, wherein the one or more beacon packets sent by the communication base station identify a first code set that comprises multiple codes, the first code set being different from association code sets for the one or more neighboring base stations;

wherein sending the first association request from the first wireless device after waiting for the delay period comprises:

accessing, at the first wireless device, data stored at the wireless device before receiving a beacon packet sent by the communication base station, the accessed data identifying the multiple association codes in the first code set, the multiple association codes respectively identifying different antennas of the communication base station;

sending one of the multiple association codes in the first code set as the association code, the association code identifying an antenna on the communication base station for communicating with the communication base station.

12. The method of claim 1, wherein the delay period is randomly selected by the wireless device from among a set of delay period, and wherein the association response identifies a propagation delay for the client device inferred by the communication base station based on the association request.

13. The method of claim 1, wherein establishing communication with the communication base station if an association response is received from the communication base station within a determined time period comprises:

receiving the association response from the communication base station within the determined time period; and transmitting data to the communication base station using a code having a first processing gain;

wherein sending the first association request comprises sending the first association request on a reserved code with a processing gain higher than the first processing gain.

14. The method of claim 13, wherein transmitting data to the communication base station comprises transmitting data to the communication base station at a first power level;

wherein sending the first association request comprises sending the first association request at a power level lower than the first power level.

15. The method of claim 1, further comprising:

randomly selecting a slot within a first contention window, the delay period being a delay until the beginning of the randomly selected slot;

sending, by the first wireless device, a second association request to a second base station during the randomly selected slot of the first contention window;

determining that an association response to the second association request is not received within a timeout period;

in response to determining that an association response to the second association request is not received within a timeout period:

determining a size of a second contention window, the size of the second contention window being twice a size of the first contention window;

randomly selecting a second slot within the second contention window; and sending a second association request to the communication base station during the randomly selected second slot of the second contention window.

16. The method of claim 1, further comprising:

selecting a slot within a first contention window;

sending, by the first wireless device, a second association request to a second base station during the randomly selected slot of the first contention window;

determining that an association response to the second association request is not received within the timeout period; and after determining that an association response to the second association request is not received within the time period, sending multiple association requests to the second communication base station, each of the multiple association requests being sent during a slot selected from a different contention window, each of the different contention windows being larger than the contention window during which the immediately previous association request was sent by the wireless device to the communication base station.

17. The method of claim 16, wherein sending multiple association requests to the communication base station comprises sending association requests to the second communication base station in randomly selected slots of contention windows of increasing sizes until the contention window reaches a predetermined maximum contention window size, wherein the method further comprises, after the contention window reaches the predetermined maximum contention window size, sending association requests to the second communication base station in randomly selected slots of contention windows having the maximum contention window size until an association response is received from the second communication base station within a corresponding timeout period or after a predetermined number of association requests have been sent.

18. An electronic communications device comprising:

one or more computer processors;

memory in electronic communications with the one or more processors and storing instructions that, when executed, perform actions comprising:

identifying one or more beacon packets received over a wireless connection by the electronic communications device;

determining a delay period so that a delay for the electronic communications device is different than a delay for electronic communications devices in a common cell with the electronic communications device;

after waiting for the delay period, sending a first association request that includes information identifying the electronic communication device and an association code;

receiving an association response from a target communication device within a determined time period, wherein the association response includes an identifier for a static slot of a repeating frame structure and an identifier for a static uplink sub-slot within the static slot, the static uplink sub-slot being designated for transmissions from the electronic communications device to the target communication device; and in response to receiving an association response from the target communication device within the determined time period, establishing communication with the target communication device.

19. The device of claim 18, wherein the one or more beacon packets identify the association code for the target communication device.

20. The device of claim 19, wherein the association code includes a code that identifies an antenna on the target communication device for communicating with the target communication device.

21. The device of claim 18, wherein the actions further comprise receiving, at the electronic communication device, beacon packets from a plurality of different target communication devices, wherein the beacon packets sent by each target communication device include one or more association codes that are distinct from association codes received from the other target communication devices, and selecting one of the association codes in preference to the other association codes.

22. The device of claim 21, wherein selecting the one of the association codes in preference to the other association codes comprises selecting the association code from a target communication device having a highest signal strength at the electronic communication device.

23. The device of claim 21, wherein selecting the one of the association codes in preference to the other association codes comprises selecting the one of the association codes randomly from among a set of association codes for the communication base station that is different from sets of association codes for other communication base stations, each of the association codes in the set of association codes identifying an antenna on the target communication device for communicating with the target communication device.

24. The device of claim 18, wherein the static uplink sub-slot is designated for transmissions from the first wireless device to the communication base station in each of multiple consecutive repetitions of the repeating frame structure.

25. The device of claim 18, wherein the actions further comprise using data stored on the electronic communication device to identify a position for the static uplink sub-slot in the repeating frame structure.

\* \* \* \* \*

UNITED STATES PATENT AND TRADEMARK OFFICE
CERTIFICATE OF CORRECTION

PATENT NO. : 8,396,086 B1  
APPLICATION NO. : 12/570866  
DATED : March 12, 2013  
INVENTOR(S) : C. Philip Gossett et al.

Page 1 of 1

It is certified that error appears in the above-identified patent and that said Letters Patent is hereby corrected as shown below:

Title Page: item (75) Inventors: delete "Xiaofang Jiang, Mntgomery, AL" and insert therefor
-- Xiaofan Jiang, Montgomery, AL --

Signed and Sealed this
First Day of April, 2014

Michelle K. Lee
*Deputy Director of the United States Patent and Trademark Office*